United States Patent
DiRenzo et al.

[11] Patent Number: 5,920,066
[45] Date of Patent: Jul. 6, 1999

[54] REAL-TIME ADAPTIVE THERMAL REFERENCE CONTROL FOR NIGHT VISION SYSTEMS

[75] Inventors: Michael T. DiRenzo, Coppel; Frank J. Moizio, Dallas, both of Tex.

[73] Assignee: Raytheon Company, Lexington, Mass.

[21] Appl. No.: 08/895,019

[22] Filed: Jul. 16, 1997

Related U.S. Application Data

[60] Provisional application No. 60/023,240, Aug. 2, 1996.

[51] Int. Cl.$^6$ ............................................. G01J 5/48
[52] U.S. Cl. ......................................... 250/252.1; 250/332
[58] Field of Search .................................. 250/252.1, 332

[56] References Cited

U.S. PATENT DOCUMENTS 5,534,695  7/1996  Miyoshi et al. ........................ 250/330
5,763,882  6/1998  Klapper et al. ........................ 250/332

*Primary Examiner*—Constantine Hannaher
*Assistant Examiner*—Andrew Israel
*Attorney, Agent, or Firm*—Baker & Botts, L.L.P.

[57] ABSTRACT

A system for normalizing an infrared detector has two control loops, each of which includes a thermal source and a command system. Each command system controls the temperature of the associated thermal source. Each command system includes an error signal source for providing an error signal indicative of the difference between a commanded temperature for the thermal source and an actual temperature at the thermal source, and includes a compensator coupled between the error signal source and the thermal source. Each compensator includes a first inverse compensation circuit responsive to the error signal for providing an output, a bandwidth maximizing compensation circuit responsive to the output of the first inverse compensation circuit, and a second inverse compensation circuit responsive to an output of the bandwidth maximizing compensation circuit. The thermal source is responsive to the output of the second inverse compensation circuit.

27 Claims, 6 Drawing Sheets

REAL-TIME ADAPTIVE THERMAL REFERENCE CONTROL FOR NIGHT VISION SYSTEMS

This application claims priority under 35 USC §119(e)(1) of provisional application number 60/023,240 filed Aug. 2, 1996.

BACKGROUND OF THE INVENTION

1. Field of the Invention

This invention relates to thermal reference control for night vision systems.

2. Brief Description of the Prior Art

Due to the non-linearity of infrared detectors as used in infrared night vision systems as a function of temperature, such systems generally utilize one or two thermal reference sources to compensate for such non-linearity in known manner. Such compensation is commonly known as normalization. One of the thermal sources, herein referred to as the level thermal reference, is generally adjusted to provide a temperature equal to the average temperature of the scene being scanned by the detector. The other thermal source, herein referred to as the gain thermal reference, is adjusted to a temperature which is a known amount different from the average temperature of the scene, e.g. +10° C. greater.

Prior art infrared night vision systems using active normalization techniques have not addressed problems of inherent non-linearities of the detector, thermal reference sources, optics, and video chain electronics as limitations in the normalization process. Since each of these elements resides within the path of the thermal reference control loop (see, for example, FIG. 1), they negatively impact the transient response (or slew rate) of the thermal reference source and thus have negative implications on the overall night vision system performance. Because the detector, in particular, inherently changes gain as a function of the scene temperature, failure to compensate for this detector non-linearity results in sluggish settling time of the thermal reference control loop. The failure is due to control loops that do not account for the aforementioned non-linearities, especially in the detector. The sluggish settling time results in inferior night vision system performance due to image degradation. Image degradation can occur in the form of image "wash out" or poor image contrast following large scene temperature changes. Large scene temperature changes can be induced through physical changes in the field of view or from changes in scene temperature within a static field of view.

Image wash out can result in unintelligible image conditions. For example, the operator of a night vision system may slew from the sky with an apparent average scene temperature of −30° C. to a ground surface with an apparent average scene temperature of 50° C. Upon performing a physical transition from viewing the sky to viewing the ground, intelligibility of the image will disappear for a period of time. This poses potentially adverse consequences to the operator. During such dynamic scene changes, the detector gain continually changes as a non-linear function of scene temperature. Left uncorrected, the gain variation adversely affects the slew rate performance of the thermal reference, resulting in less than optimal duration of image degradation. Since the thermal reference source is attempting to track and equal the required average scene temperature, minimizing the recovery time from an unintelligible image back to an intelligible image is largely dependent upon continually optimizing the bandwidth of the thermal reference control loop. Applicants are unaware that this problem has been recognized or solved in the prior art.

SUMMARY OF THE INVENTION

In accordance with the present invention, there is provided a real-time measurement and removal of non-linearities associated with the detector, thermal references, optics, and video-chain electronics to suppress the varying gain of the system plant. In addition, the present invention provides for a function within the compensator that maximizes bandwidth of the thermal reference under all operating scenarios. This function is transparent to system performance when loop errors between the command (scene average temperature) and the feedback (thermal reference average temperature) are small. As loop errors increase, the system gain also increases as a function of the loop error magnitude. As a result, bandwidth of the thermal reference loop is always maximized to insure that the time duration of unintelligible images is minimized. Moreover, this approach insures that the response of the thermal reference itself is the only limiting factor in the transient performance of the night vision system. The present invention can be used in night vision systems employing both one or two thermal reference sources for active normalization. When one thermal reference source is used, it is operated to alternately act as both the level thermal reference and the gain thermal reference source.

Briefly, in accordance with the present invention, non-linearities are continually removed within the thermal reference control loops of the night vision system. The removal of the non-linearities permits closed loop control of the thermal references with maximum and near constant bandwidth. Maximum bandwidth of the control loop essentially translates into faster transient response of the thermal reference sources. The transient response of the thermal reference sources, which are used to calibrate the detector, is important to night vision system performance because the thermal references must track the dynamic temperature variations in the viewable scene. Therefore, maximal response of the calibration sources translates to maximum performance of the night vision system. In addition to providing maximal bandwidth over all operational conditions, the present invention permits:

1. Replacement/interchange of critical components without costly, time consuming recalibration of system adjustments.
2. the use of IR detectors from different manufacturers without system modification.
3. Consistent performance from system to system without calibrating each system.

The removal of detector non-linearities, denoted as f(), not accounted for in the prior art system is accomplished by adding to each control loop the inverse function $f^{-1}_{est}()$. Since the resulting thermal reference loop has $f^{-1}_{est}()*f()$, the result is "1". The inverse function, which must track the non-linearities introduced by the detector, is derived by use of the detector itself and by the use of temperature sensors which measure the temperature at each of the thermal reference sources. The function $f^{-1}_{est}()$ is determined by the formula:

$$f_{est}^{-1}() = \frac{(\text{Gain Ref Temp} - \text{Level Ref Temp})}{(\text{Bits gain} - \text{Bits level})}$$

where,

Gain Ref Temp=the temperature of the gain thermal reference, in ° C.

Level Ref Temp=the temperature of the level thermal reference, in ° C.

Bits gain=the average output of the detector when viewing the gain thermal reference, in bits Bits level=the average output of the detector when viewing the level thermal reference, in bits The achievement of maximum, near constant bandwidth, not accounted for in the prior art system, is accomplished by adding to each control loop a non-linear gain that insures that the thermal reference is slewed at the maximum rate possible when loop errors are large. The non-linear gain is achieved by the algorithm:

linear part=K_linear*input non_linear part=input$^2$*sign(input)

if (non_linear_part>limit) then non_linear_part=limit if (non_linear_part<-limit) then non_linear_part=-limit output=linear part+non_linear part;

where, input=algorithm input

K_linear=gain for linear portion of algorithm limit=maximum physical thermal reference slew capability output=algorithm output In the above algorithm, the non-linear portion of the output is dominant when the linearized error is large and negligible when the linearized error is small. Conversely, the linear portion of the output is dominant when the linearized error is small and negligible when the linearized error is large.

The removal of thermal reference non-linearities, denoted as g(), not accounted for in the prior art system, is accomplished by adding to each control loop the inverse function $g^{-1}_{est}()$. Since the resulting thermal reference loop has $g^{-1}_{est}()*g()$ the result is "1". The inverse function, which must track the non-linearities introduced by the thermal reference is derived based on the characteristics of the thermal reference using well known curve fitting methods. The dashed line in FIG. 7, for example, shows a two-point curve fit to typical thermal reference transfer function data. The curve fit produces a function such as:

$$g_{est}^{-1}(x) = K_1 \text{ for } x \geq 0$$
$$K_2 \text{ for } x < 0.$$

where, $K_1$ and $K_2$=constants resulting from the curve fit x=the controlled parameter for a thermal reference A function in this form is often called a gain schedule.

DESCRIPTION OF THE PREFERRED EMBODIMENT

Figure 1:
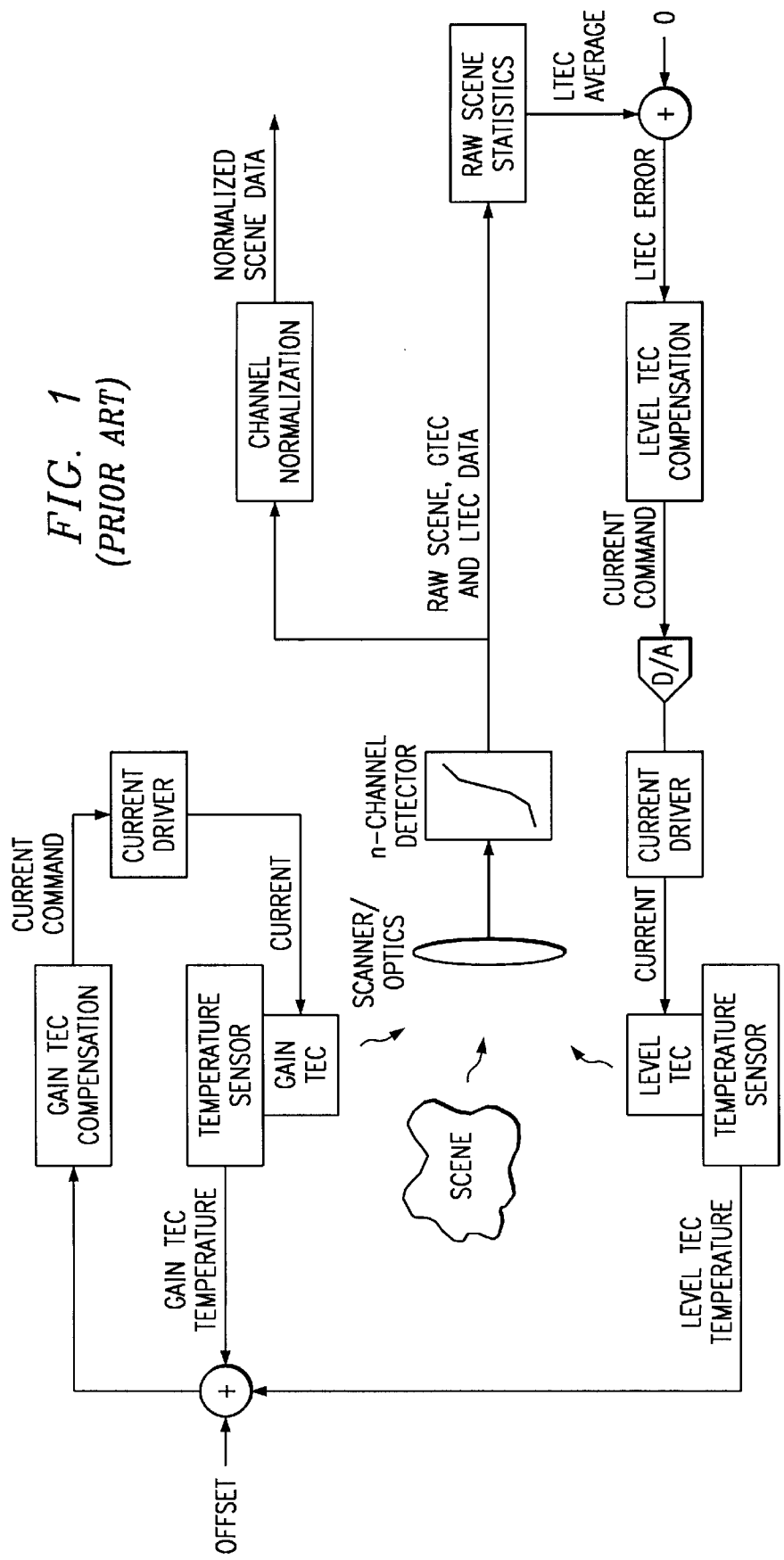
FIG. 1 is a block diagram of a first prior art circuit for controlling the thermal references in a two-point (gain and level) channel normalization for an infrared imaging system.

Referring first to FIG. 1, there is shown an example of a prior art system for controlling the thermal references in a two-point (gain and level) channel normalization for an infrared imaging system. In the preferred embodiment, thermal electric coolers (TECs) provide the thermal references. Herein, the term TEC is used synonomously with the term thermal reference. Likewise, level TEC and gain TEC are used synonomously with level thermal reference and gain thermal reference, respectively. TEC temperature is controlled by the amount and direction of the electric current flow through the device. To facilitate level normalization, a level TEC loop is used to drive the level TEC temperature equal to the average scene temperature. In the level TEC loop, the detector is the feedback sensor and zero is the command signal. The feedback and command signals are compared to produce an error signal. The error signal is processed via compensation algorithms and the desired TEC current is calculated.

To facilitate gain normalization, it is desired to drive the gain TEC temperature equal to some fixed delta-temperature away from the average scene temperature. The temperature offset is typically chosen to be 10° C. above the average scene temperature. In this example, the gain TEC temperature is controlled using a temperature sensor as the feedback sensor for the control loop. Temperature sensors are mounted on both the level and gain TEC's. The level TEC temperature plus an offset equivalent to 10° C. is used as the command signal for the gain TEC loop.

Figure 2:
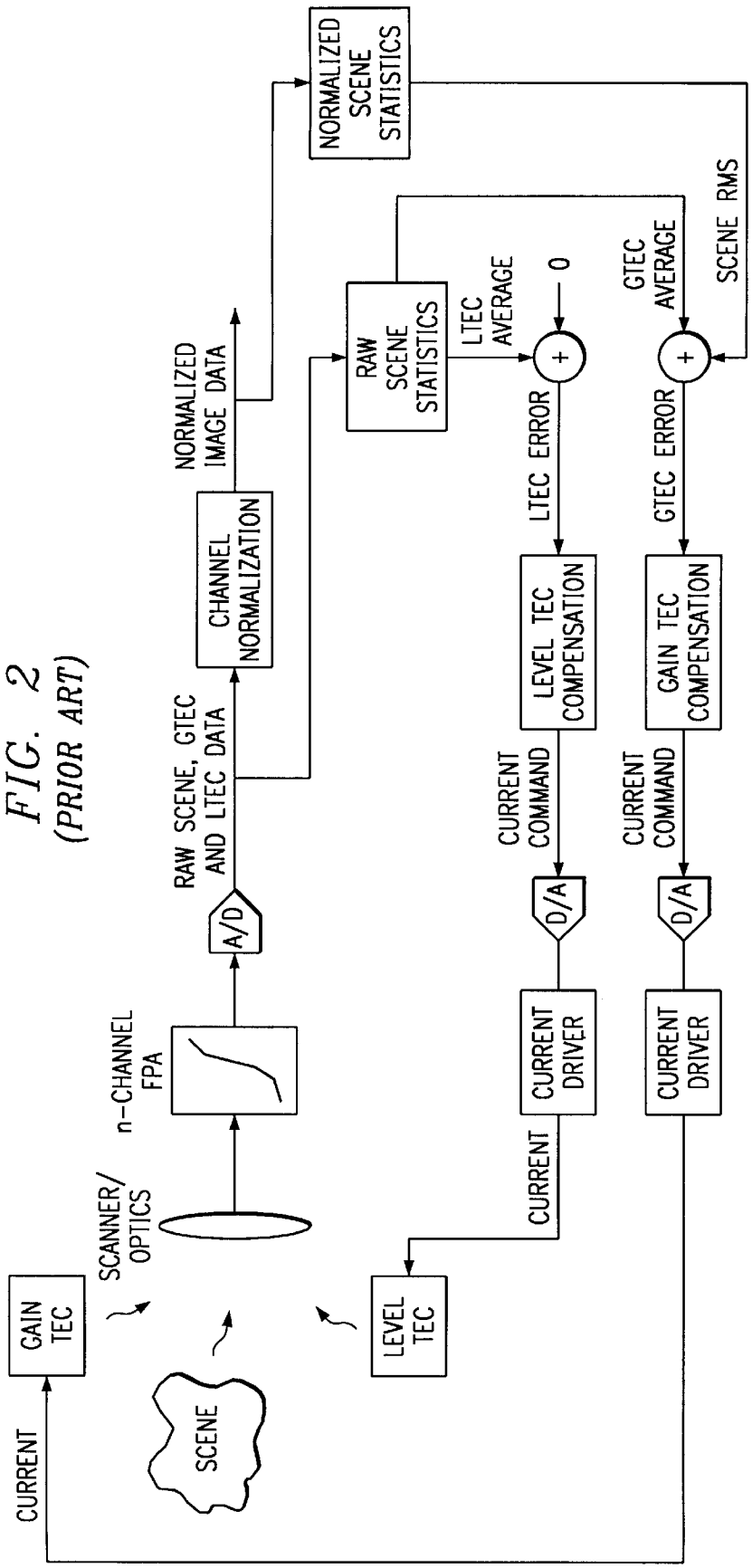
FIG. 2 is a block diagram of a second prior art circuit for control of thermal references in a two-point channel normalization for an infrared imaging system.

Referring to FIG. 2, there is shown a second example of a prior art system for controlling the thermal references. In this system, the level TEC loop is configured as in FIG. 1. The gain TEC control loop, however, is configured so that it also uses the detector as the feedback sensor in the loop. The gain TEC temperature is controlled by commanding the gain TEC sample averages to the scene RMS value, or some fixed value such as 10° C. higher than the level TEC.

Figure 3:
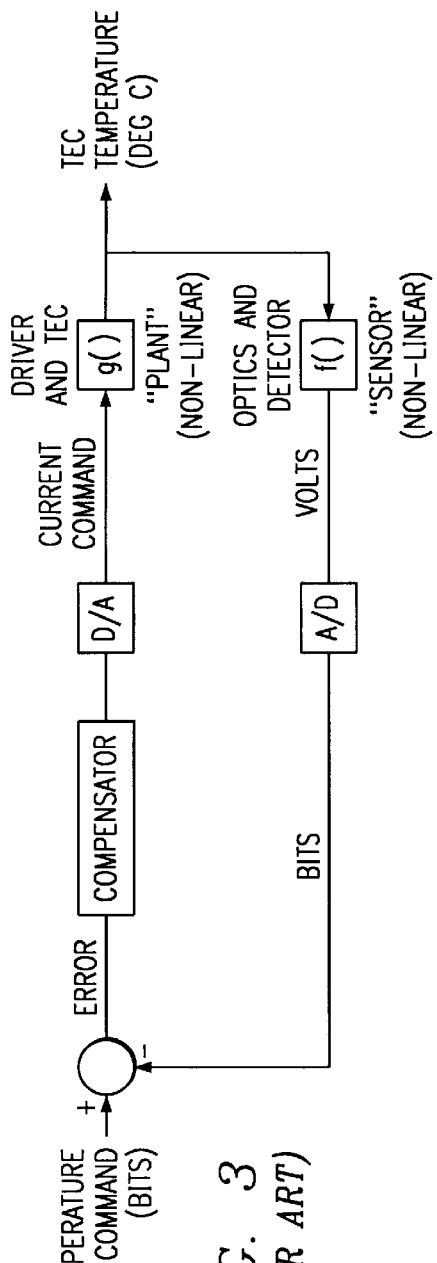
FIG. 3 is a basic block diagram of a single thermal reference control loop in accordance with the prior art.

In basic terms, the thermal reference loops of the prior art can be described by the control system block diagram shown in FIG. 3 which shows a negative feedback control system arrangement including a plant, a sensor, and a compensator. The plant for the thermal reference loop is the TEC and its current driver. This plant can be described by a block having a non-linear transfer function, g(), which has some value of degrees C. per ampere of commanded current. The sensor in the thermal reference loop is the detector and optics, and can be described by a block having a non-linear transfer function, f(), which is some value of volts (or bits once the voltage is converted to a digital representation) per degree C. The design of the compensator for the prior art thermal reference control loops applies no correction of the non-linear functions f() and g().

The primary weakness in each of the above described prior art examples is that the thermal reference control loop compensators do not take into account the non-linearity, f(), of the detector and optics. The detector is a highly non-linear function of the inherent responsivity of the detector, the scene temperature and the ambient temperature. This means that for any given detector, the transfer function in bits per degree C. can vary significantly as a function of operating conditions. This presents several limitations. First, the control loops must be designed with very large stability margins to insure that the loops will remain stable over the variety of operating scenarios. Large stability margins imply that the responsiveness of the system will be very sluggish. The variable response of the detector also causes the bandwidth of the control loops to vary. Ultimately, this means that the dynamic response of the imaging system will also vary. This variation is quite undesirable because under one scenario, the video may normalize very sluggishly and in another the video may be on the verge of instability while the thermal reference loops settle and the channel normalization process comes to steady state. Furthermore, the transfer function, f(), can vary significantly from detector to detector. Therefore, a control loop compensation designed for one detector may be unsuitable for another detector. Costly tuning of the control loops for each individual system is usually required.

A secondary weakness of the prior art is the neglect of the non-linear response, g(), of the TEC. Although the nonlinearities in the TEC are typically not as severe as with the detector, they should be recognized and compensated for in order to achieve optimum performance.

Figure 4:
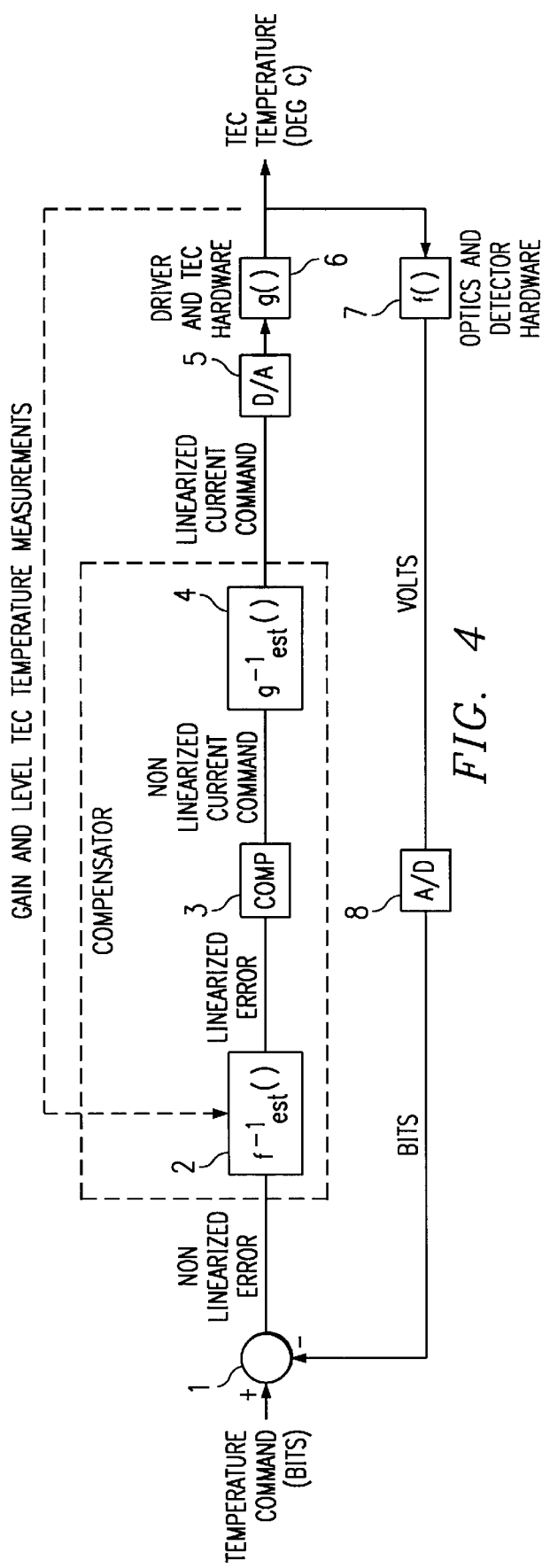
FIG. 4 is a simplified block diagram of a single thermal reference control loop in accordance with the present invention.

In its simplest terms, a feature of the present invention can be described by the block diagram of FIG. 4 which is a simplified block diagram of the invention for one TEC loop. The summing junction (1), $f^{-1}_{est}()$ (block 2), compensator (block 3), and $g^{-1}_{est}()$ (block 4) are algorithms implemented in software on a digital signal processor (DSP). The D/A converter (block 5), g() (block 6), f() (block 7), and A/D converter (block 8) represent the hardware implementation. A complete description of the algorithms which make up the thermal reference control loops is found in APPENDIX A. Further description of each of blocks 1 to 8 is provided hereinbelow.

The output of summing junction (1) is an error signal between the desired temperature of the TEC and the actual temperature of the TEC.

The $f^{-1}_{est}()$ (block 2) has as inputs the error signal from block 1, temperature measurements from both the gain and level TECs and the TEC temperatures as sensed by the detector for both the gain and level TECs. The output thereof is the linearized error signal. The purpose of this block is to instantaneously remove the non-linear characteristics of the detector, optics, and video chain electronics in the thermal reference control loop. This block operates in accordance with the algorithm:

linearized_error=$f^{-1}_{est}()$*error where:

linearized_error=the output of block 2 error=temperature error signal (output of block 1)

$$f^{-1}_{est}() = \frac{(GTEC\,temp - LTEC\,temp)}{(GTEC\,bits - LTEC\,bits)}$$

and,

GTEC temp=the temperature of the gain TEC, in ° C.

LTEC temp=the temperature of the level TEC, in ° C.

GTEC bits=the average output of the detector when viewing the gain TEC, in bits

Figure 6:
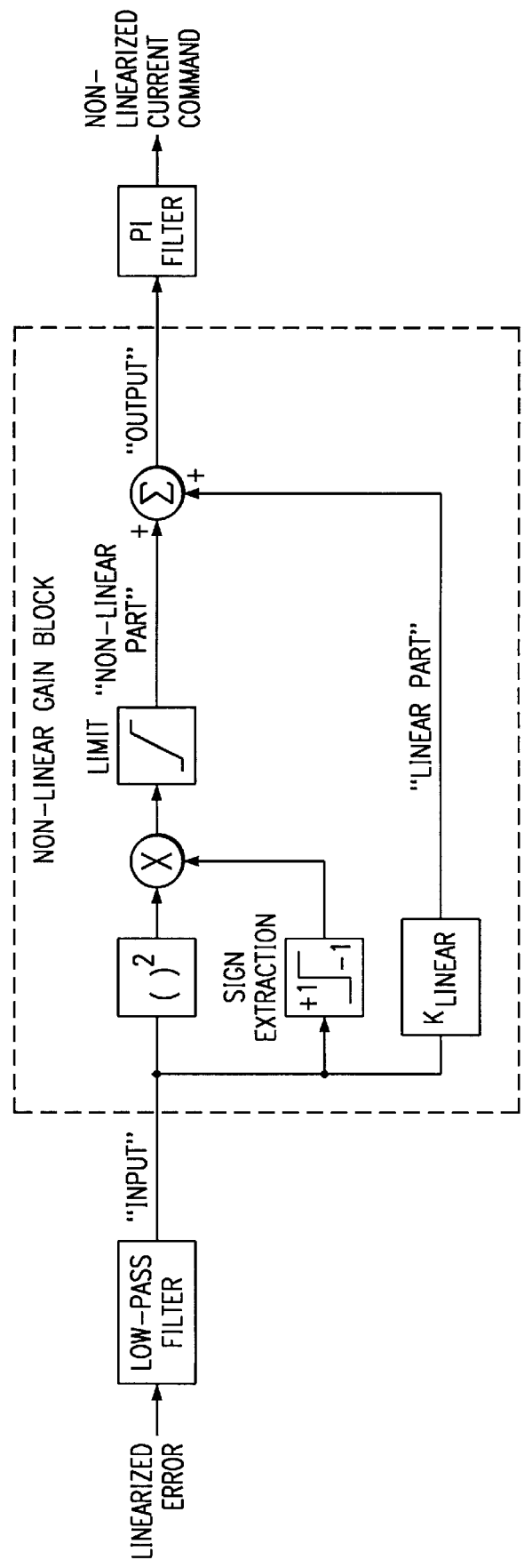
FIG. 6 is a detailed block diagram of the compensation (COMP) block which is shown in FIG. 5 and (block 3) shown in FIG. 4.
Figure 7:
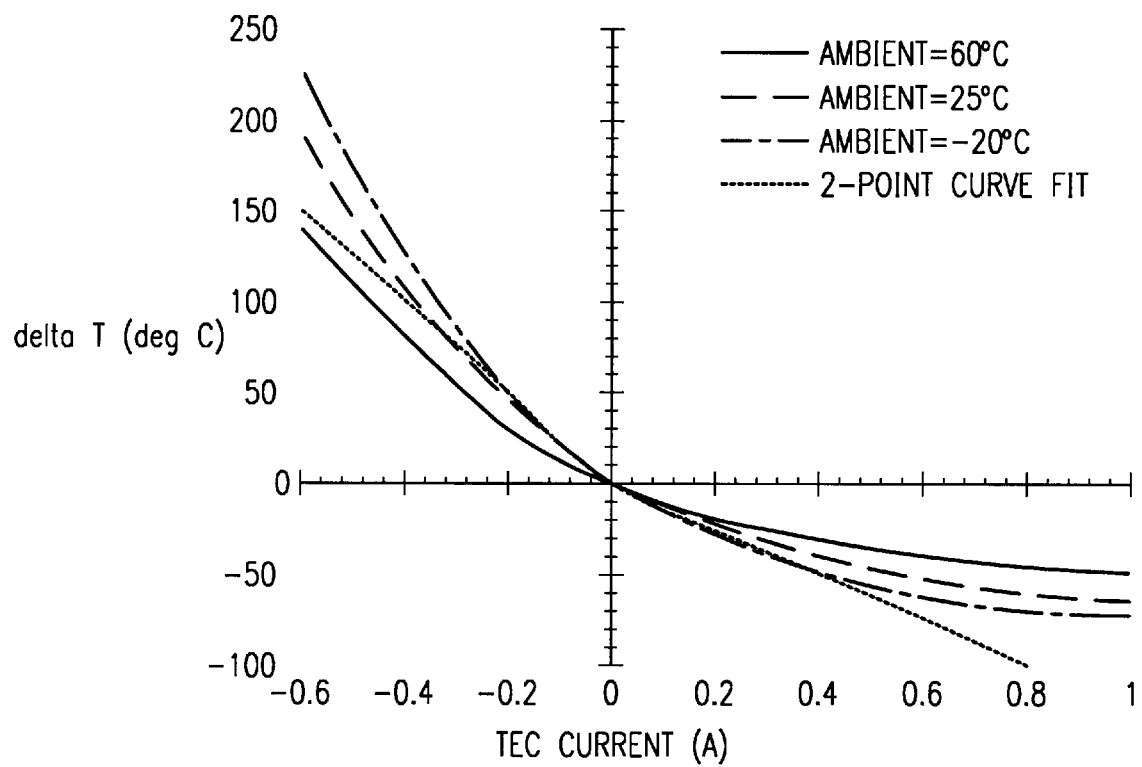
FIG. 7 is a graph showing typical thermal reference transfer function characteristics for three different temperature conditions.

LTEC bits=the average output of the detector when viewing the level TEC, in bits The compensator (block 3) receives the linearized error term from block 2 as its input and provides a non-linearized current command signal as its output. The purpose of this block is to provide the necessary signal processing such that satisfactory transient and steady-state system performance is obtained. The compensator (block 3) is a combination of linear and non-linear algorithms. An expansion of block 3 is shown in FIG. 6. The linearized error signal is first processed through a low-pass filter in order to remove any high frequency noise. Low-pass filter algorithms are well known and thus not described here. The low-pass filter output is then processed through the non-linear gain function which insures that the thermal reference is slewed at the maximum rate possible when loop errors are large. The non-linear gain is achieved by the algorithm:

linear_part=K_linear*input non_linear_part=input$^2$*sign(input)

if (non_linear_part>limit) then non_linear part=limit if (non_linear_part<-limit) then non_linear_part=-limit output=linear_part+non_linear_part;

where, input=algorithm input

K_linear=gain for linear portion of algorithm limit=maximum physical thermal reference slew capability output=algorithm output The output of the non-linear gain block is processed by a proportional plus integral (PI) filter to produce the non-linearized current command. PI filters are also well known and thus not described here.

The $g^{-1}_{est}()$ (block 4) receives a non-linearized current command signal as its input and provides as an output a current command signal which has been linearized to account for non-linearities in the TEC and current driver hardware. This signal is a quantity of bits which, when converted to an analog signal by the D/A converter (block 5), is a voltage proportional to the desired TEC current. The purpose of this block is to instantaneously remove the non-linear characteristics of the TEC and current driver in the thermal reference control loop. This block operates in accordance with the algorithm:

output=$g^{-1}_{est}$(icmd)*icmd, where, output=the linearized current command icmd=non-linearized current command, the block input and, $$g_{est}^{-1}(icmd) = 4 \text{ mA}/°C \text{ for } icmd \geq 0$$
$$8 \text{ mA}/°C \text{ for } icmd < 0.$$

The values and complexity of $g^{-1}_{set}()$ are dependent upon the particular TECs or other thermal reference sources used in the application. A two-point gain schedule as shown above has shown to be effective in the preferred embodiment.

The D/A converter (block 5) is standard hardware and converts a digital signal input in bits to an analog output signal in volts.

The g() (block 6) represents the current driver and TEC hardware. This blocks receives from the D/A converter (block 5) an input voltage corresponding to the desired TEC current and provides as an output the temperature of the TEC.

The f() (block 7) represents the optics, detector, and video chain electronics hardware in the IR night vision system. In the context of the thermal reference loop, this block receives from g() (block 6) the temperature of the TEC and provides a voltage output corresponding to the temperature of the TEC. Block 7, therefore performs the function of converting from temperature to voltage via the optics and the detector. The TEC emits energy in the form of photons. The photon emission is in accordance with Planck's radiation laws—essentially the higher the temperature of the TEC, the more photons that are emitted. The purpose of the optics is to transfer the photons from the TEC onto the optical image plane. The detector, or set of detectors, located in the optical image plane, converts the photon flux into an electrical signal.

The A/D converter (block 8) is standard hardware and converts an analog signal input in volts to a digital output signal in bits.

Figure 5:
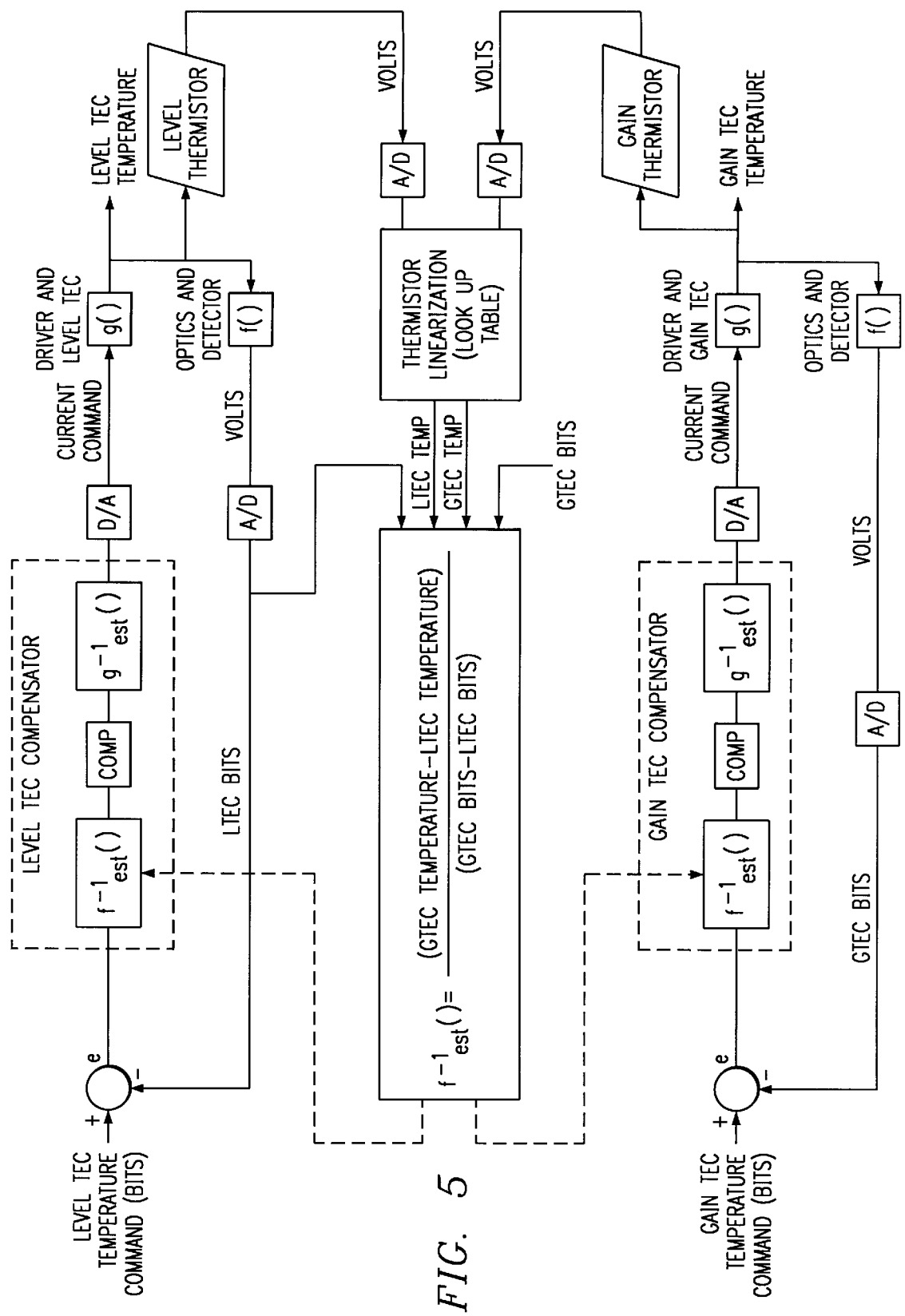
FIG. 5 is a block diagram for controlling the thermal references in a two-point channel normalization for an infrared imaging system in accordance with the present invention.

FIG. 5 is an implementation of the present invention using thermistors to provide TEC temperature information as discussed above with reference to FIG. 4. Thermistors are suitable for sensing temperature because their electrical resistance varies as some known non-linear function of temperature. This variation is commonly represented by the equation:

$$R_T = R_{T0} \exp\{\beta(1/T - 1/T_0)\}$$

where, $R_T$=resistance at absolute temperature, T (T=temperature in °C.+273.15)

$R_{T0}$=resistance at absolute temperature, $T_0$ $\beta$=a constant that depends on the thermistor material exp{x}=e, the naperian base (2.71828 . . . ) raised to the power x.

Figure 8:
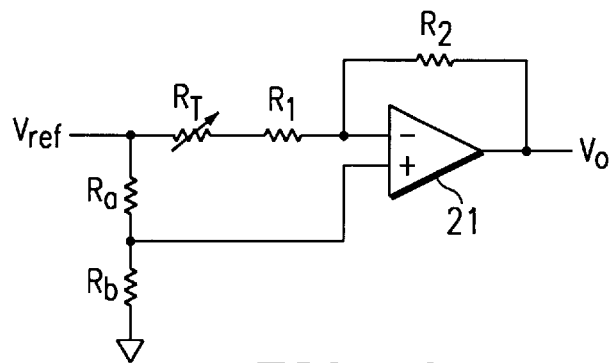
FIG. 8 is a thermistor pick-off circuit which can be used in accordance with the present invention.

FIG. 8, shows an example of a thermistor and pick-off circuit. The circuit includes an operation amplifier 21 having a feedback resistor $R_2$ thereacross from the output $V_O$ to the negative input. Input voltage $V_{ref}$ is fed to the negative input via a variable resistor $R_T$ (which represents the thermistor, as defined above) and a series resistor $R_1$. The input terminal with $R_{ref}$ is coupled to the positive input of amplifier 21 via a resistor $R_a$ with the positive input being coupled to a reference voltage source via a resistor $R_b$. The circuit operates in accordance with the equation:

$$V_O = (R_b/(R_a+R_b))V_{ref} - (R_2/(R_1+R_T))V_{ref} + (R_b/(R_a+R_b))(R_2/(R_1R+R_T))V_{ref}$$

where, $V_{ref}$=fixed reference voltage $R_1$, $R_2$, $R_a$, $R_b$=fixed resistor values $R_T$=as defined above $V_O$=circuit output.

To determine the thermistor temperature, the pick-off circuit voltage is sampled by the control processor and the voltage from the pick-off circuit is transformed back into °C. via a look-up table or polynomial linearization algorithm. The look-up table or algorithm is algebraically derived from the transfer functions above for $V_O$ and $R_T$ by solving for temperature, T, in terms of $V_O$, with all other parameters being known. This relates voltage measured from the thermistor pick-off circuit to the actual TEC temperature.

Essentially, the invention incorporates the inverse of estimates of the instantaneous non-linear transfer function characteristics of the detector and optics, $f^{-1}_{est}()$, and the TEC, $g^{-1}_{est}()$, into the control system compensator. This is a very powerful feature since $f()f^{-1}_{est}()$ is approximately equal to 1 and $g()g^{-1}_{est}()$ is approximately equal to 1. The continuous linearization of the control loop therefore reduces the compensator to the relatively simple task of designing a compensator for a linear time-invariant system.

It is clear that $f^{-1}_{est}()$ must have units of °C./bit and the $g^{-1}_{est}()$ must have units of amp/°C. The estimates can be obtained from either direct measurement or derived from a model of the physical characteristics of detector and/or TEC. Typically, the direct measurement approach provides greater accuracy than a model based approach, with the trade-off being that a direct measurement will add the cost of a measurement sensor to the system.

An estimation technique for $f^{-1}_{est}()$ using direct measurements is shown in the preferred embodiment. Estimation of $f^{-1}_{est}()$ is facilitated by the fact that the dynamics of the measurement sensors (the thermistors and the detector) are much quicker than the rate of change in the estimated quantity. A model based approach for $g^{-1}_{est}()$ is shown in the preferred embodiment, because the dynamics of the thermal references are sufficiently slow such that estimation algorithm difficulties arise.

An example of a real-time adaptive thermal reference control loop algorithm using two TECs is shown in APPENDIX A. The algorithm was simulated and verified using standard time-domain simulation tools and also verified in real hardware. The simulation of the real-time adaptive thermal reference control loop using two TECs is provided in APPENDIX B. The thermal reference transient response output of the simulation shown in APPENDIX B is illustrated in APPENDIX C.

It should be understood that, though the invention has been described with reference to a compensation circuit including compensation $g^{-1}_{est}()$ for non-linearities g(), these non-linearities are not as important as those regarding compensation for f(). Accordingly, a circuit without the $g^{-1}_{est}()$ compensation is also considered as part of the present invention.

The present invention is applicable in any forward looking infrared (FLIR) system using active normalization with thermal reference sources.

Though the invention has been described with reference to a specified preferred embodiment thereof, many variations and modifications will immediately become apparent to those skilled in the art. It is therefore the intention that the appended claims be interpreted as broadly as possible in view of the prior art to include all such variations and modification.

APPENDIX A: Real-Time Adaptive Thermal Reference Control Loop Algorithm Using Two TECs

1.0 Level TEC Control (U)

1.1 Inputs (U)

(U) The following parameters will be input by this function form the source function or hardware indicated.

Raw Level TEC Mean
  Source: On-Gimbal/Calculate Means
  Description: Level TEC mean for all 240 channels
  Type: Float
  Range: -2048 to +2047

Raw Gain TEC Mean
  Source: On-Gimbal/Calculate Means
  Description: Gain TEC mean for all 240 channels
  Type: Float
  Range: -2048 to +2047

Raw Scene Mean
  Source: On-Gimbal/Calculate Means
  Description: Scene mean for all 240 channels
  Type: Float
  Range: -2048 to +2047

Front-End Gain
  Source: Global Gain Processing
  Description: Global Gain used for keeping the Global Level Loop bandwidth constant
  Type: Float
  Range: +0.1 to +10

Linearize Level TEC Thermistor
  Source: On Gimbal/Linearize Thermistors
  Description: Linearized Level TEC thermistor data
  Type: Float
  Range: -2048 to +2047

Linearize Gain TEC Thermistor
  Source: On Gimbal/Linearize Thermistors

Appendix A-1

APPENDIX A: Real-Time Adaptive Thermal Reference Control Loop Algorithm Using Two TECs Description:    Linearized Gain TEC thermistor data
    Type:    Float
    Range:    -2048 to +2047

Linearize Level TEC Heatsink Thermistor
    Source:    On Gimbal/Linearize Thermistors
    Description:    Linearized Level TEC thermistor data
    Type:    Float
    Range:    -2048 to +2047

Raw Scene Mean Intialize
    Source:    Initialize/Adjustment Algorithm
    Description:    The value of scene mean upon initialization and until init. is complete
    Type:    Float
    Range:    -2048 to +2047 bits

Freeze Command
    Source:    Initialize/Adjustment Algorithm
    Description:    Freeze Level TEC processing
    Type:    Integer
    Range:    0 - 1 bits (1=true, 0 = false)

Initialization Complete Flag
    Source:    Initialize/Adjustment Algorithm
    Description:    Keep levelTEC driving to raw_Scene_Mean_initialize unitil initialization is complete
    Type:    Integer
    Range:    0 - 1 bits (1=true, 0 = false)

1.2 Processing (U)

(U) There will be two TEC Control loops executing, one for the Level TEC and one for the gain TEC. The Level TEC temperature is driven to equal the scene mean temperature while the gain TEC temperature is driven to equal the scene mean temperature plus a temperature delta of 10 degrees C. (This delta of 10 degrees C is really what is intended at the scene input to the system, this value will be appropriately scaled to TBD.) The block diagram illustration of the Level TEC Loop algorithm, "Level TEC Processing", is shown in Figure 4.10.

Michael Direnzo      Frank J. Moizio

Appendix A-2

APPENDIX A: Real-Time Adaptive Thermal Reference Control Loop Algorithm Using Two TECs (U) This algorithm will execute at 60 Hz based on Raw Scene Mean, Level TEC Mean, Gain TEC Mean, Level TEC Thermistor, Gain TEC Thermistor, and effective Global Gain.

```
/* Check the Level TEC feedback and Level TEC heatsink thermistors. If either of   */
/* the thermistors are greater than TEC_temp_threshold set the TEC drive = 0. Shut down */
/* drive to the TECs. Subtract raw_Level_TEC_Mean from raw_Gain_TEC_Mean. Limit   */
/* the difference.  */ if(Linearize Level TEC Thermistor || Linearize Level TEC Heatsink Thermistor >
   TEC_temp_threshold)
{
level_TEC_drive_command(n) = 2048;
level_TEC_shut_down(n)     = TBD;
}
else
{
    if(freeze_command = 1)
        level_TEC_drive_command(n) = level_TEC_drive_command(n-1);
    else
        {
        if(initialization_complete_flag = 0)
            raw_Scene_Mean = raw_Scene_Mean_initialize;

raw_GTEC_LTEC_diff(n) = raw_gain_TEC_mean(n) - raw_level_TEC_mean(n);

if (raw_GTEC_LTEC_diff(n) ≥ GTEC_LTEC_diff_upper_limit)
    limited_raw_GTEC_LTEC_diff(n) = GTEC_LTEC_diff_upper_limit;

elseif (raw_GTEC_LTEC_diff(n) ≤ GTEC_LTEC_diff_lower_limit)
    limited_raw_GTEC_LTEC_diff(n) = GTEC_LTEC_diff_lower_limit;

else
    limited_raw_GTEC_LTEC_diff(n) = raw_GTEC_LTEC_diff(n);

/* Subtract the linearized Level thermistor temperature from the linearized Gain thermistor */
/* temperature. Determine the normalize_detector_gain_factor by dividing the              */
/* limited_raw_GTEC_LTEC_diff(n), (which is the equal to the difference of the gain and    */
/* level TEC in bits), by the difference of the linearized gain and level TEC thermistors  */
/* (which is equal to the temp difference in degrees).                                     */
```

Michael Direnzo          Frank J. Moizio

Appendix A-3

APPENDIX A: Real-Time Adaptive Thermal Reference Control Loop Algorithm Using Two TECs thermistor_temp_difference(n) =  linearized_gain_thermistor_temp(n) -
                                              linearized_level_thermistor_temp(n)

if (thermistor_temp_difference(n) ≥ thermistor_temp_diff_upper_limit)
    limited_thermistor_temp_difference(n) = thermistor_temp_diff_upper_limit;

elseif (thermistor_temp_difference(n) ≤ thermistor_temp_diff_lower_limit)
    limited_thermistor_temp_difference(n) = thermistor_temp_diff_lower_limit;

else
    limited_thermistor_temp_difference(n) = thermistor_temp_difference(n)

normalize_detector_factor(n) =
    limited_thermistor_temp_difference(n)/limited_raw_GTEC_LTEC_diff(n)

```
/* Subtract the raw_Level_TEC_Mean from the raw_Scene_Mean to determine the    */
/* level_TEC_error                                                              */
``` level_TEC_error(n) = raw_Scene_Mean(n) - raw_level_TEC_Mean(n)

```
/* Multiply the level_TEC_error by the normalize detector gain factor. Negate the result to  */
/* account for the TEC characteristics:   positive voltage = cold                             */
/*                                         negative voltage = hot                             */
``` normalized_level_TEC_error(n) = -(level_TEC_error(n)*normalize_detector_factor(n))

```
/* Compute a bilinear transform Low-Pass filter.                                */
```

Note: Initial algorithm will not include this function within the control loop path because of the tradeoff between lower noise and increased phase margin. Increased phase margin and lower overshoot are more significant considerations than noise for the purposes of this application. However, the error term will be filtered and the filtered output will serve as the integrator controller.

level_TEC_lpf_out(n) = -a1 * level_TEC_lpf_out(n-1) +
                                  b1 * [normalized_level_TEC_error(n) +
                                  normalized_level_TEC_error(n-1)];

Michael Direnzo            Frank J. Moizio

APPENDIX A: Real-Time Adaptive Thermal Reference Control Loop Algorithm Using Two TECs /* Compute non-linear gain function for enhancement of loop transient response for large   */
/* changes in scene dynamics.   */ non_linear_gain_out(n) = sign_normalized_level_TEC_error(n)
    * (normalized_level_TEC_error(n))$^2$ * non_linear_gain;

/* Bound the gain of the $x^2$ function. */ if (non_linear_gain_out(n) ≥ non_linear_upper_limit)
    limited_non_linear_gain_out(n) = non_linear_upper_limit;

elseif (non_linear_gain_out(n) ≤ non_linear_lower_limit)
    limited_non_linear_gain_out(n) = non_linear_lower_limit;

else
    limited_non_linear_gain_out(n) = non_linear_gain_out(n);

/* Compute the linear gain function. */ linear_gain_out(n) = linear_gain * normalized_level_TEC_error(n);

/* Add the linear or minimal path gain to the limited_non_linear_gain_out(n) and multiply   */
/* the result by the level TEC loop gain.   */ loop_gain_out(n) = loop_TEC_gain * (limited_non_linear_gain_out(n) + linear_gain_out(n))

/* Compute non-linear bilinear transform proportional integral if the low pass filtered level   */
/* TEC error is within 3 degrees.   */ if(level_TEC_lpf_out(n) ≥ high_temp_threshold)
    level_TEC_integral_out(n) = level_TEC_limited_integral_out(n-1);

elseif(level_TEC_lpf_out(n) ≤ low_temp_threshold)
    level_TEC_integral_out(n) = level_TEC_limited_integral_out(n-1);

else
    level_TEC_integral_out(n) = level_TEC_limited_integral_out(n-1) +
        k_i_z_domain * [loop_gain_out(n) +

Appendix A-5

APPENDIX A: Real-Time Adaptive Thermal Reference Control Loop Algorithm Using Two TECs

```
                    loop_gain_out(n-1)];

if(level_TEC_integral_out(n) ≥ integ_upper_limit)
    level_TEC_limited_integral_out(n) = integ_upper_limit;

elseif(level_TEC_integral_out(n) ≤ integ_lower_limit)
    level_TEC_limited_integral_out(n) = integ_lower_limit;

else
    level_TEC_limited_integral_out(n) = level_TEC_integral_out(n);

level_TEC_pout(n) = (k_p_z_domain * loop_gain_out(n)) +
                    level_TEC_limited_integral_out(n);

/* Compute gain scheduling. The gain scheduling results from the TEC non-linearity   */
/* which has a general factor of 2 difference between the hot and cold transfer function. */
/* Note: TEC operational characteristics: positive voltage = cold                    */
/*                                        negative voltage = hot                    */ if(level_TEC_pout(n) > zero_drive)
    level_TEC_pre_drive_command(n) = gain_schedule*level_TEC_pout(n);
else
    level_TEC_pre_drive_command(n) = level_TEC_pout(n);

/* Scale and limit DAC command */

/* Round and convert to integer. Also add 2048 (or 800H) to the result prior to the D/A write */
/* because of the offset binary mode of the D/A converter.                                    */
/*         0    =  000H  =  -10V                                                              */
/*         2048 =  800H  =  0V                                                                */
/*         4095 =  FFFH  =  +9.99512                                                          */
/* DAC Type: AD664                                                                            */
/* Invert the result to hardware.                                                             */ level_TEC_drive_command(n) = -(level_TEC_pre_drive_command(n) + 0.5 + 2048)

if(level_TEC_pre_drive_command(n) > dac_upper_limit)
    level_TEC_drive_command(n) = dac_upper_limit;
```

Michael Direnzo _____  Frank J. Moizio _____

Appendix A-6

APPENDIX A: Real-Time Adaptive Thermal Reference Control Loop Algorithm Using Two TECs

```
if(level_TEC_pre_drive_command(n) < dac_lower_limit)
    level_TEC_drive_command(n) = dac_lower_limit;
        }
}
/* Constants */
```

| | | |
|---|---|---|
| $T_s$ | = | $1.0/F_s$; |
| $F_s$ | = | 60Hz; |
| $f_c$ | = | 13.26Hz; |
| $w_c$ | = | $2*pi*f_c$; |
| GTEC_LTEC_diff_upper_limit | = | 2000; |
| GTEC_LTEC_diff_lower_limit | = | 100; |
| thermistor_temp_diff_upper_limit | = | 25; |
| thermistor_temp_diff_lower_limit | = | 5; |
| non_linear_gain | = | 1; |
| non_linear_upper_limit | = | 100; |
| non_linear_lower_limit | = | -100; |
| linear_gain | = | 0.5; |
| loop_TEC_gain | = | 25; |
| high_temp_threshold | = | 3; |
| low_temp_threshold | = | -3; |
| zero_drive | = | 0.0; |
| gain_schedule | = | 2.0; |

Low-Pass Filter Constants:
bilinear transform prewarping (computed in initialization)

| | | |
|---|---|---|
| $w_p$ | = | $2*F_s*tan(w_c/(2*F_s))$; | bilinear transform coefficients (computed in initialization)

| | | |
|---|---|---|
| a1 | = | $(-2/w_p + T)/(2/w_p + T)$; |
| b0 | = | $T_s/(2/w_p + T_s)$; |
| b1 | = | $T_s/(2/w_p + T_s)$; |

Proprtional-Integral Compensator Constants:
bilinear transform coefficients (computed in initialization)

| | | |
|---|---|---|
| k_i_s_domain | = | 3; |
| k_i_z_domain | = | k_i_s_domain * $T_s$ /2 ; |
| kp_s_domain | = | 4; |
| kp_z_domain | = | kp_s_domain; |

Michael Direnzo    Frank J. Moizio

Appendix A-7

APPENDIX A: Real-Time Adaptive Thermal Reference Control Loop Algorithm Using Two TECs

| | | |
|---|---|---|
| integ_upper_limit | = | +2047; |
| integ_lower_limit | = | -2048; |
| dac_upper_limit | = | +4095; |
| dac_lower_limit | = | 0; |
| TEC_temp_threshold | = | 95 (deg C); |

/* Initialize variables */

| | | |
|---|---|---|
| integ_out(n-1) | = | 0.0; |
| loop_gain_out(n-1) | = | 0.0; |
| level_TEC_lpf_out(n-1) | = | 0.0; |
| normalized_level_TEC_error(n-1) | = | 0.0; |
| level_TEC_limited_integral_out(n-1) = | | 0.0; |

1.3 Outputs (U)

(U) The following parameters will be output by this function to the destination function or hardware indicated.

Level TEC Drive Command
- Destination: H/W
- Description: Level TEC Drive command
- Type: Integer
- Range: 0 to +4095

Normalized Level TEC Error(n)
- Destination: Initialize/Adjustment Algorithm
- Description: Scene Mean minus Level TEC Mean error in degrees
- Type: Float
- Range: -2048 to +2047

2.0 Gain TEC Control (U)

2.1 Inputs (U)

(U) The following parameters will be input by this function form the source function or hardware indicated.

Appendix A-8

APPENDIX A: Real-Time Adaptive Thermal Reference Control Loop Algorithm Using Two TECs

Raw Level TEC Mean
    Source:       On-Gimbal/Calculate Means
    Description:  Level TEC mean for all 240 channels
    Type:         Float
    Range:       -2048 to +2047

Raw Gain TEC Mean
    Source:       On-Gimbal/Calculate Means
    Description:  Gain TEC mean for all 240 channels
    Type:         Float
    Range:       -2048 to +2047

Raw Scene Mean
    Source:       On-Gimbal/Calculate Means
    Description:  Scene mean for all 240 channels
    Type:         Float
    Range:       -2048 to +2047

Front-End Gain
    Source:       Global Gain Processing
    Description:  Global Gain
    Type:         Float
    Range:       0.1 to 10

Level TEC Thermistor
    Source:       H/W
    Description:  Level TEC thermistor data
    Type:         Float
    Range:       -2048 to +2047

Gain TEC Thermistor
    Source:       H/W
    Description:  Gain TEC thermistor data
    Type:         Float
    Range:       -2048 to +2047

Linearize Level TEC Heatsink Thermistor
    Source:       On Gimbal/Linearize Thermistors
    Description:  Linearized Level TEC thermistor data Michael Direnzo      Frank J. Moizio Appendix A-9

APPENDIX A: Real-...ne Adaptive Thermal Reference Control Loop Algorithm Using Two TECs Type:     Float
    Range:    -2048 to +2047

Raw Scene Mean Intialize
    Source:       Initialize/Adjustment Algorithm
    Description:  The value of scene mean upon initialization and until init. is complete
    Type:         Float
    Range:       -2048 to +2047 bits

Freeze Command
    Source:       Initialize/Adjustment Algorithm
    Description:  Freeze Gain TEC processing
    Type:         Integer
    Range:       0 - 1 bits (1=true, 0 = false)

Initialization Complete Flag
    Source:       Initialize/Adjustment Algorithm
    Description:  Keep Gain TEC driving to raw_Scene_Mean_initialize + offset unitil initialization is complete
    Type:         Integer
    Range:       0 - 1 bits (1=true, 0 = false)

FOV_Position
    Source:       On-Gimbal/FOV Processing
    Description:  Represents the NFOV, MFOV, and WFOV position
    Type:         Integer
    Range:       0 - 2 bits

2.2 Processing (U)

(U) There will be two TEC Control loops executing, one for the Level TEC and one for the gain TEC. The Level TEC temperature is driven to equal the scene mean temperature while the gain TEC temperature is driven to equal the scene mean temperature plus a temperature delta of 10 degrees C. The block diagram illustration of the Gain TEC Loop algorithm, "Gain TEC Processing", is shown in Figure 4.10.

(U) This algorithm will execute at 60 Hz based on Raw Scene Mean, Level TEC Mean, Gain TEC Mean, Level TEC Thermistor, Gain TEC Thermistor, and effective Global Gain.

Michael Direnzo        Frank J. Moizio

Appendix A-10

APPENDIX A: Real-Time Adaptive Thermal Reference Control Loop Algorithm Using Two TECs

```
/* Check the Gain TEC feedback and Gain TEC heatsink thermistors. If either of   */
/* the thermistors are greater than TEC_temp_threshold set the TEC drive = 0.Shut down */
/* drive to the TECs. Subtract raw_Level_TEC_Mean from raw_Gain_TEC_Mean. Limit   */
/* the difference.   */ if(Linearize Gain TEC Thermistor || Linearize Gain TEC Heatsink Thermistor >
    TEC_temp_threshold)
{
gain_TEC_drive_command(n) = 2048;
gain_TEC_shut_down(n)     = TBD;
}
else
{
    if(freeze_command = 1)
        gain_TEC_drive_command(n) = gain_TEC_drive_command(n-1);
    else
    {
            if(Initialization_complete_flag = 0)
            raw_Scene_Mean = raw_Scene_Mean_initialize;

/* Determine Field of View Position and assign the appropriate delta T to accommodate  */
/* for optics differences.                                                              */ if(FOV_Position = NFOV)
    delta_T = delta_T_NFOV;

elseif(FOV_Position = MFOV)
    delta_T = delta_T_MFOV;

elseif(FOV_Position = WFOV)
    delta_T = delta_T_WFOV;

/* Subtract raw_Level_TEC_Mean from raw_Gain_TEC_Mean. Limit the difference.   */ raw_GTEC_LTEC_diff(n) = raw_gain_TEC_mean(n) - raw_level_TEC_mean(n);

if (raw_GTEC_LTEC_diff(n) ≥ GTEC_LTEC_diff_upper_limit)
```

Michael Direnzo _____  Frank J. Moizio _____

Appendix A-11

APPENDIX A: Real-Time Adaptive Thermal Reference Control Loop Algorithm Using Two TECs

```
    limited_raw_GTEC_LTEC_diff(n) = GTEC_LTEC_diff_upper_limit;

elseif (raw_GTEC_LTEC_diff(n) ≤ GTEC_LTEC_diff_lower_limit)
    limited_raw_GTEC_LTEC_diff(n) = GTEC_LTEC_diff_lower_limit;

else
    limited_raw_GTEC_LTEC_diff(n) = raw_GTEC_LTEC_diff(n);

/* Subtract the linearized Level thermistor temperature from the linearized Gain    */
/* thermistor temperature. Determine the normalize_detector_gain_factor by dividing */
/* the limited_raw_GTEC_LTEC_diff(n), (which is the equal to the difference of the  */
/* gain and level TEC in bits), by the difference of the linearized gain and level TEC */
/* thermistors (which is equal to the temp difference in degrees).                  */ thermistor_temp_difference(n) =    linearized_gain_thermistor_temp(n) -
                                   linearized_level_thermistor_temp(n)

if (thermistor_temp_difference(n) ≥ thermistor_temp_diff_upper_limit)
    limited_thermistor_temp_difference(n) = thermistor_temp_diff_upper_limit;

elseif (thermistor_temp_difference(n) ≤ thermistor_temp_diff_lower_limit)
    limited_thermistor_temp_difference(n) = thermistor_temp_diff_lower_limit;

else
    limited_thermistor_temp_difference(n) = thermistor_temp_difference(n);

normalize_detector_factor(n) =
    limited_thermistor_temp_difference(n)/limited_raw_GTEC_LTEC_diff(n)

/* Subtract the normalized_Gain_TEC_Mean from the addition of the                   */
/* normalized_Scene_Mean with delta_T in degrees to determine the gain_TEC_error.   */ gain_TEC_error(n) = (raw_Scene_Mean(n) -
                    raw_gain_TEC_Mean(n))*normalize_detector_factor + delta_T /* Negate the gain_TEC_error to account for the TEC characteristics.                */
/*      positive voltage = cold                                                     */
/*      negative voltage = hot                                                      */ gain_TEC_error(n) = -gain_TEC_error(n)
```

Appendix A-12

APPENDIX A: Real-Time Adaptive Thermal Reference Control Loop Algorithm Using Two TECs /* Compute a bilinear transform Low-Pass filter.    */

Note: Initial algorithm will not include this function within the control loop path because of the tradeoff between lower noise and increased phase margin. Increased phase margin and lower overshoot are more significant considerations than noise for the purposes of this application. However, the error term will be filtered and the filtered output will serve as the integrator controller.

gain_TEC_lpf_out(n) =   -a1 * gain_TEC_lpf_out(n-1) +
                         b1 * [gain_TEC_error(n) +
                         gain_TEC_error(n-1)];

/* Compute non-linear gain function for enhancement of loop transient response for    */
/* large changes in scene dynamics.                                                    */ non_linear_gain_out(n)  =  sign_gain_TEC_error(n)
                           * (normalized_gain_TEC_error(n))$^2$ * non_linear_gain;

/* Bound the gain of the $x^2$ function.    */ if (non_linear_gain_out(n) ≥ non_linear_upper_limit)
    limited_non_linear_gain_out(n) = non_linear_upper_limit;

elseif (non_linear_gain_out(n) ≤ non_linear_lower_limit)
    limited_non_linear_gain_out(n) = non_linear_lower_limit;

else
    limited_non_linear_gain_out(n) = non_linear_gain_out(n);

/* Compute the linear gain function.    */ linear_gain_out(n) = linear_gain * gain_TEC_error(n);

/* Add the linear or minimal path gain to the limited_non_linear_gain_out(n) and multiply    */
/* the result by the gain TEC loop gain.                                                      */ loop_gain_out(n) = loop_TEC_gain * (limited_non_linear_gain_out(n) + linear_gain_out(n))

/* Compute non-linear bilinear transform proportional integral if the low pass filtered gain    */

Michael Direnzo          Frank J. Moizio

Appendix A-13

APPENDIX A: Real-Time Adaptive Thermal Reference Control Loop Algorithm Using Two TECs /* TEC error is within 3 degrees. */

```
if(gain_TEC_lpf_out(n) ≥ high_temp_threshold)
    gain_TEC_integral_out(n) = gain_TEC_limited_integral_out(n-1);

elseif(gain_TEC_lpf_out(n) ≤ low_temp_threshold)
    gain_TEC_integral_out(n) = gain_TEC_limited_integral_out(n-1);

else
    gain_TEC_integral_out(n) = gain_TEC_limited_integral_out(n-1) +
                               k_i_z_domain * [loop_gain_out(n) +
                               loop_gain_out(n-1)];

if(gain_TEC_integral_out(n) ≥ integ_upper_limit)
    gain_TEC_limited_integral_out(n) = integ_upper_limit;

elseif(gain_TEC_integral_out(n) ≤ integ_lower_limit)
    gain_TEC_limited_integral_out(n) = integ_lower_limit;

else
    gain_TEC_limited_integral_out(n) = gain_TEC_integral_out(n);

gain_TEC_pout(n) = (k_p_z_domain * loop_gain_out(n)) +
                   gain_TEC_limited_integral_out(n);
```

/* Compute gain scheduling. The gain scheduling results from the TEC non-linearity */
/* which has a general factor of 2 difference between the hot and cold transfer function. */
/* Note: TEC operational characteristics: positive voltage = cold */
/*                                         negative voltage = hot */

```
if(gain_TEC_pout(n) > zero_drive)
    gain_TEC_pre_drive_command(n) = gain_schedule*gain_TEC_pout(n);
else
    gain_TEC_pre_drive_command(n) = gain_TEC_pout(n);
```

/* Scale and limit DAC command */

/* Round and convert to integer. Also add 2048 (or 800H) to the result prior to the D/A write */
/* because of the offset binary mode of the D/A converter. */

Appendix A-14

APPENDIX A: Real-Time Adaptive Thermal Reference Control Loop Algorithm Using Two TECs

```
/*        0    = 000H =  -10V                                              */
/*        2048 = 800H =   0V                                               */
/*        4095 = FFFH= +9.99512V                                           */
/* DAC Type: AD664                                                         */
/* Invert the result to hardware.                                          */ gain_TEC_drive_command(n) = -(gain_TEC_pre_drive_command(n) + 0.5 + 2048);

if(gain_TEC_pre_drive_command(n) > dac_upper_limit)
    gain_TEC_drive_command(n) = dac_upper_limit;

if(gain_TEC_pre_drive_command(n) < dac_lower_limit)
    gain_TEC_drive_command(n) = dac_lower_limit;
            }
}

/* Constants */

T_s                              =   1.0/F_s;
F_s                              =   60Hz;
f_c                              =   13.26Hz;
w_c                              =   2*pi*f_c;
GTEC_LTEC_diff_upper_limit       =   2000;
GTEC_LTEC_diff_lower_limit       =   100;
thermistor_temp_diff_upper_limit =   25;
thermistor_temp_diff_lower_limit =   5;
delta_T_NFOV                     =   8.882;
delta_T_MFOV                     =   8.539;
delta_T_WFOV                     =   7.650;
non_linear_gain                  =   0.8;
non_linear_upper_limit           =   100;
non_linear_lower_limit           =   -100;
linear_gain                      =   0.5;
loop_TEC_gain                    =   25;
high_temp_threshold              =   3;
low_temp_threshold               =   -3;
zero_drive                       =   0.0;
gain_schedule                    =   2.0;
TEC_temp_threshold               =   95;
```

Michael Direnzo          Frank J. Moizio

APPENDIX A: Real-Time Adaptive Thermal Reference Control Loop Algorithm Using Two TECs Low-Pass Filter Constants:
bilinear transform prewarping (computed in initialization)
$w_p$ = $2*F_s*\tan(w_c/(2*F_s))$;
bilinear transform coefficients (computed in initialization)
a1 = $(-2/w_p + T)/(2/w_p + T)$;  (0.09121)
b0 = $T_s/(2/w_p + T_s)$;  (0.45439)
b1 = $T_s/(2/w_p + T_s)$;  (0.45439)

Proprtional-Integral Compensator Constants:
bilinear transform coefficients (computed in initialization)
k_i_s_domain = 3;
k_i_z_domain = k_i_s_domain * $T_s$ /2 ;
kp_s_domain = 4;
kp_z_domain = kp_s_domain;
integ_upper_limit = +2047;
integ_lower_limit = -2048;
dac_upper_limit = +4095;
dac_lower_limit = 0;

/* Initialize variables */ gain_TEC_limited_integral_out(n-1) = 0.0;
loop_gain_out(n-1) = 0.0;
gain_TEC_lpf_out(n-1) = 0.0;
gain_TEC_error(n-1) = 0.0;
gain_TEC_limited_integral_out(n-1) = 0.0;
delta_T = 8.539;

2.3 Outputs (U)

(U) The following parameters will be output by this function to the destination function or hardware indicated.

Gain TEC Drive Command
    Destination: H/W
    Description: Level TEC Drive command
    Type: Integer
    Range: 0 to +4095

Normalized Level TEC Error(n)

Appendix A-16

APPENDIX A: Real-Time Adaptive Thermal Reference Control Loop Algorithm Using Two TECs Destination: Initialize/Adjustment Algorithm
Description: Scene Mean +10 deg equivalent minus Level TEC Mean error in degrees
Type: Float
Range: -2048 to +2047

RECEIVED
SEP 21 1995
TI PATENT DEPT

Michael Direnzo          Frank J. Moizio

Appendix A-17

*Real-Time Adaptive Thermal Reference Control For Night Vision Systems*

APPENDIX B
Simulation Of The Real-Time Adaptive Thermal Reference Control Loop Using Two TEC's.

Michael T. DiRenzo  Frank J. Moizio

Appendix B-1

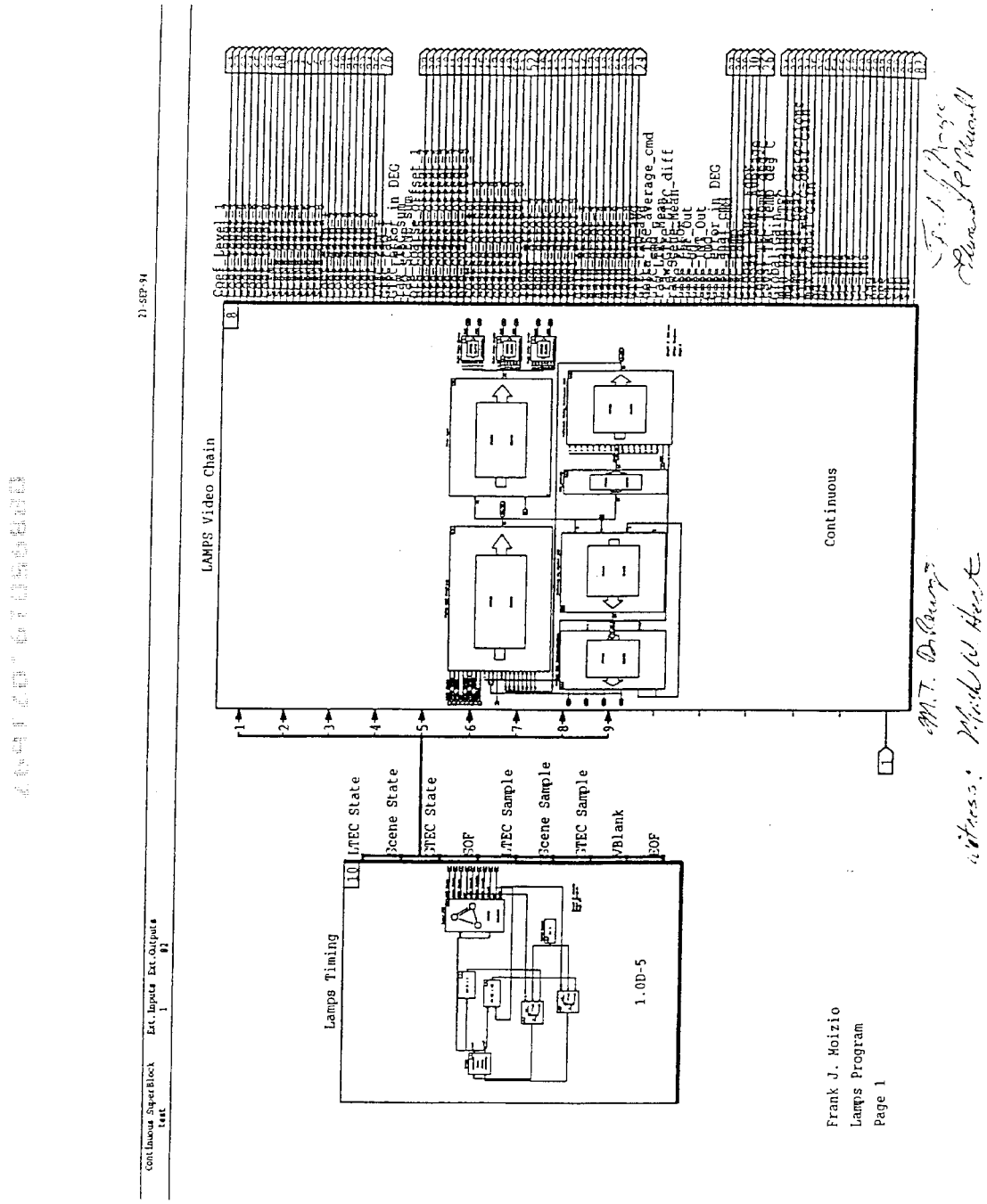

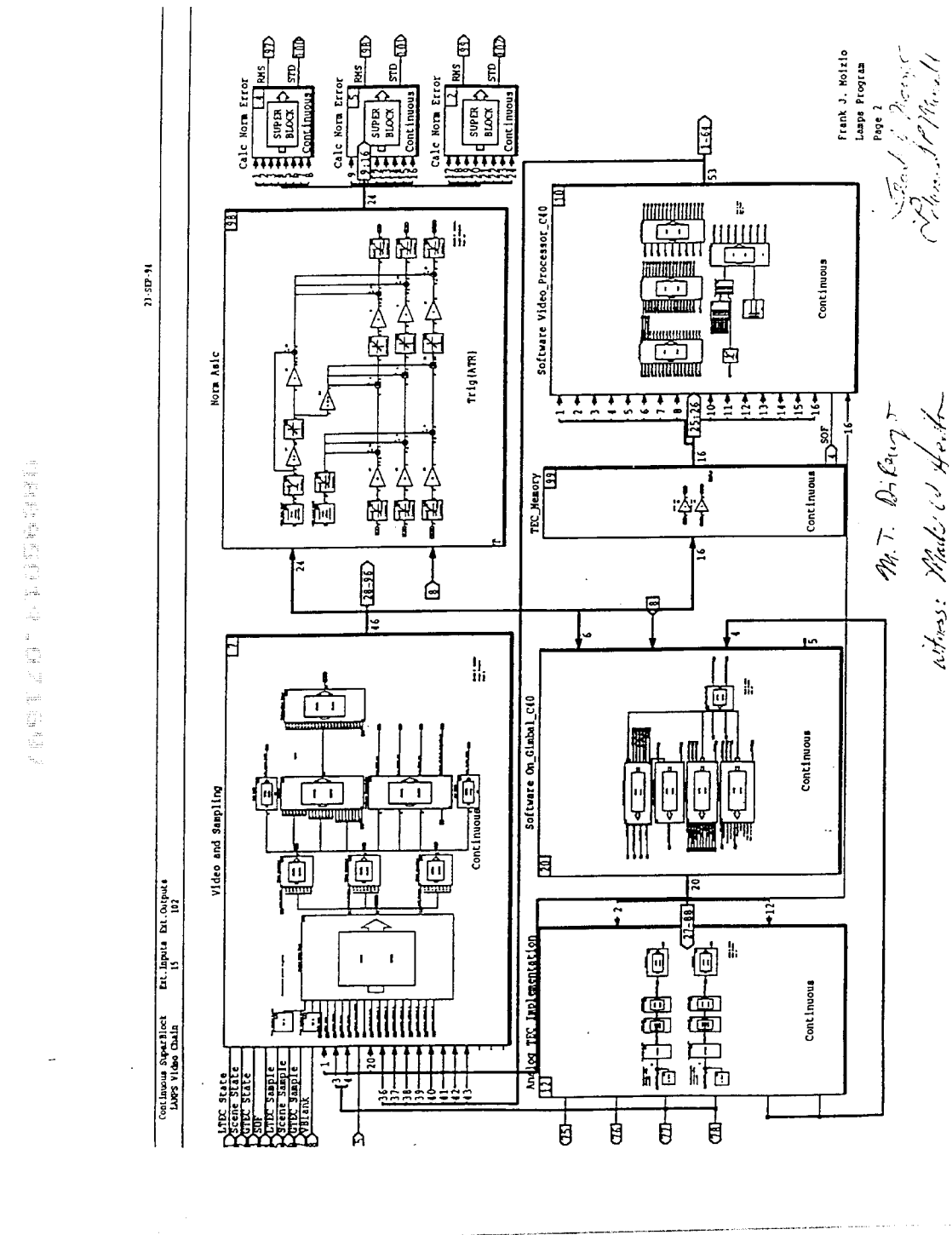

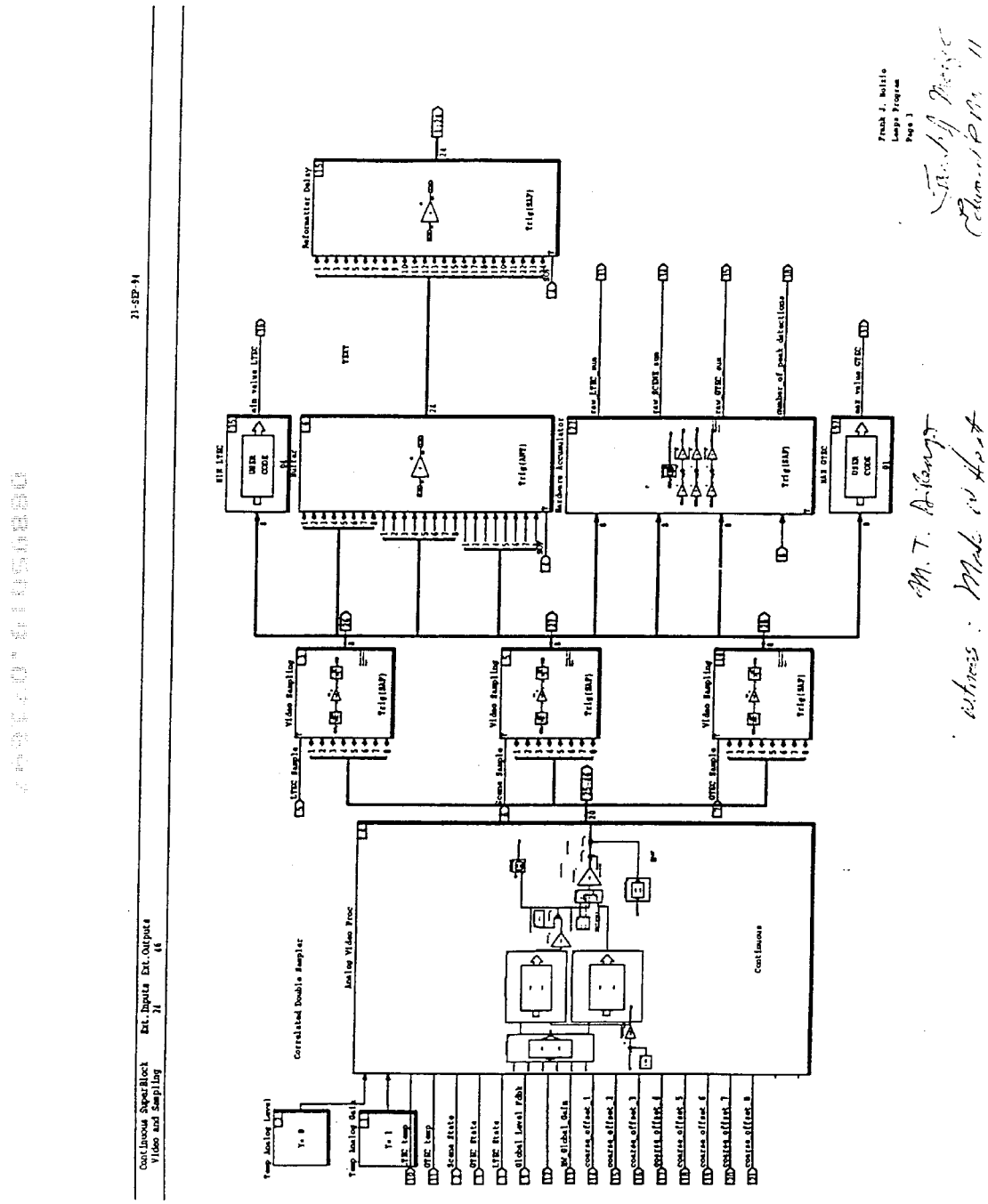

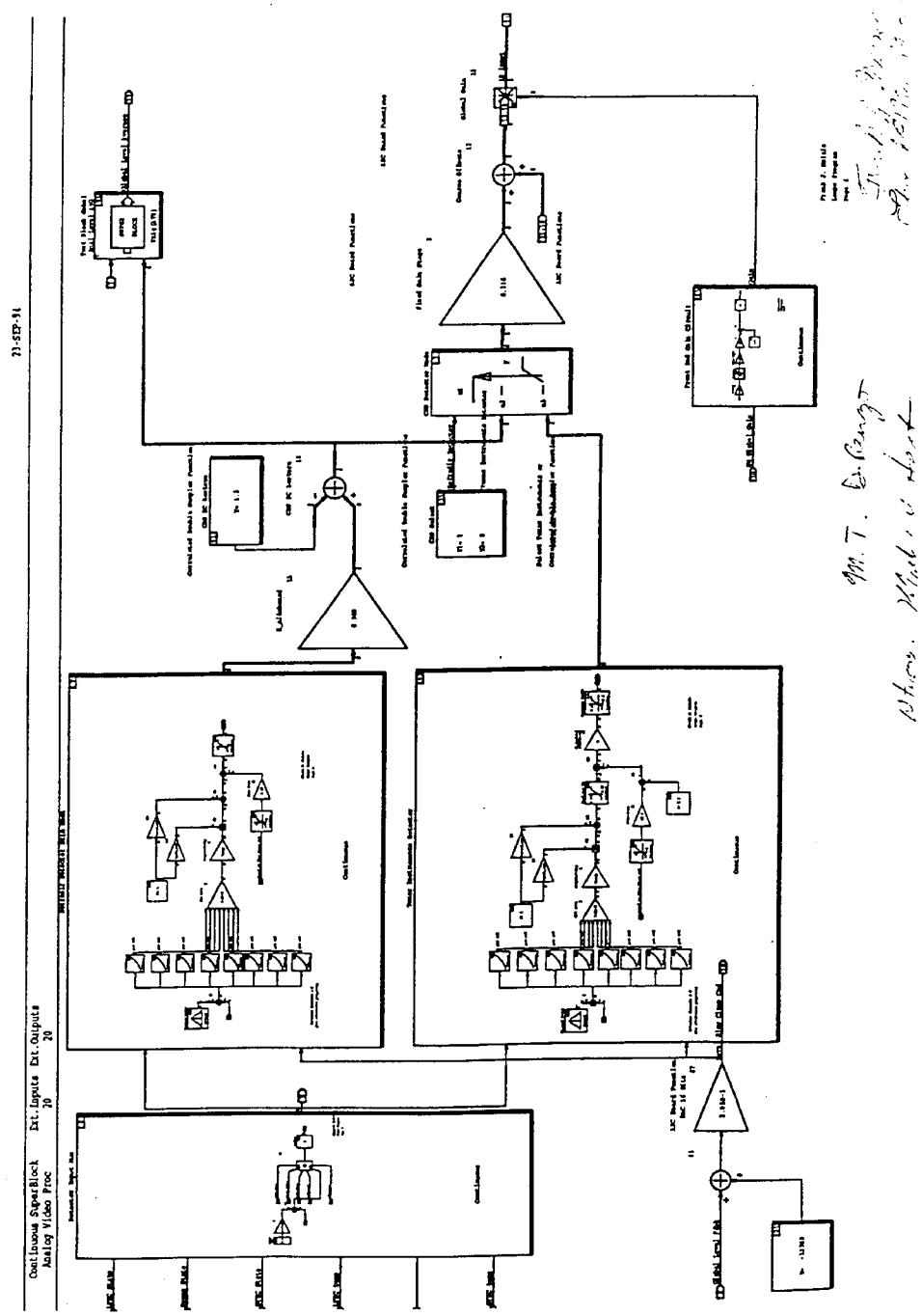

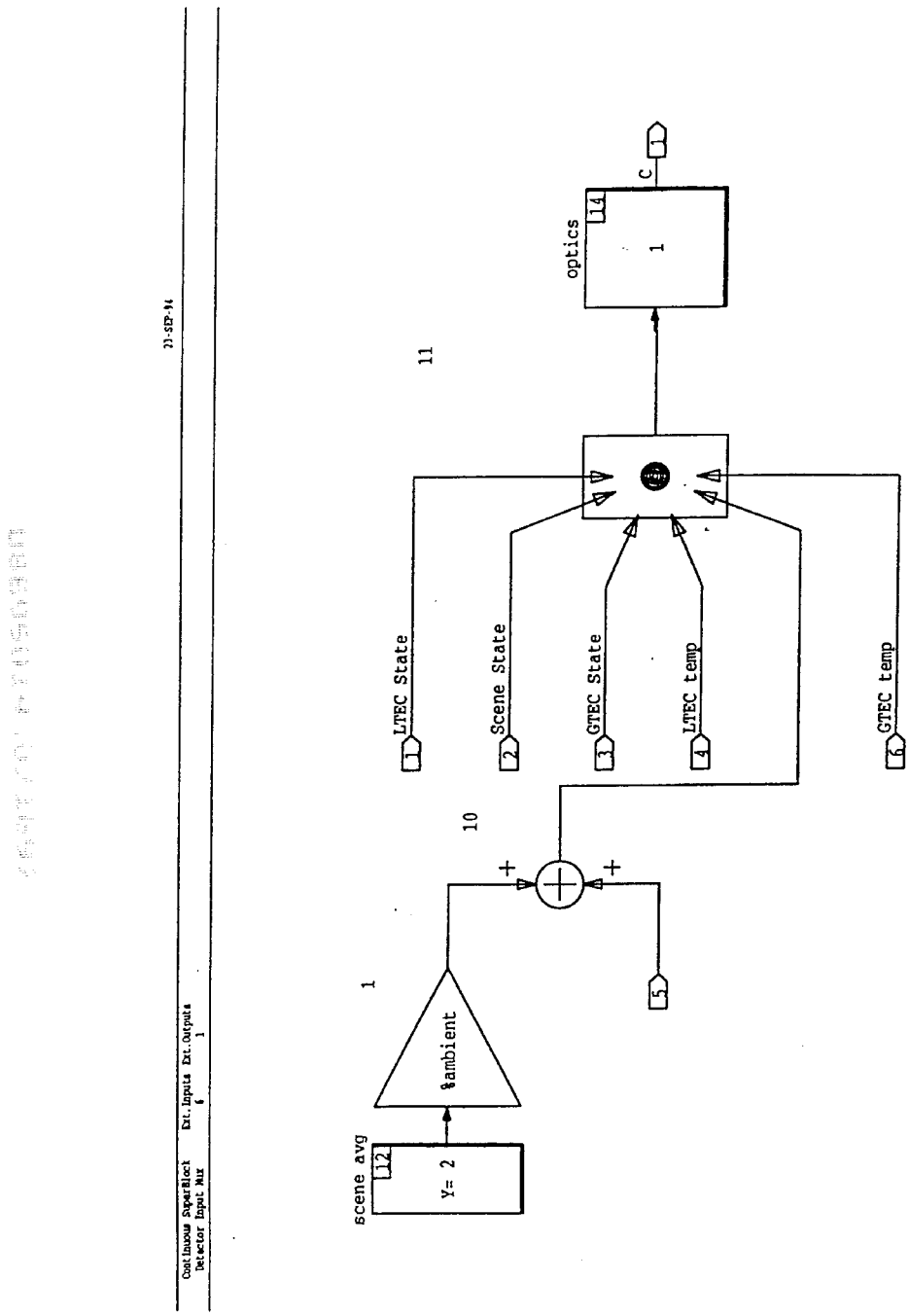

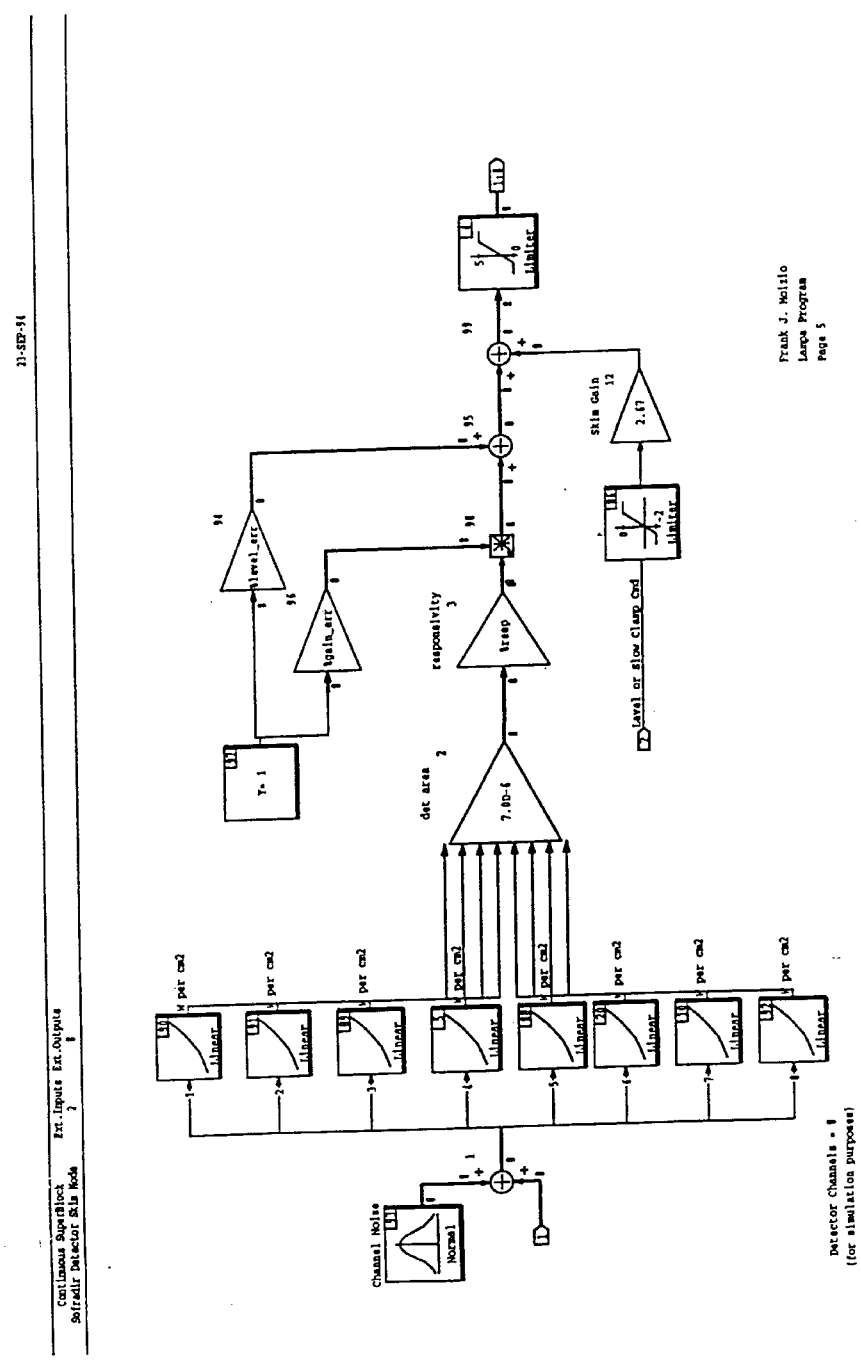

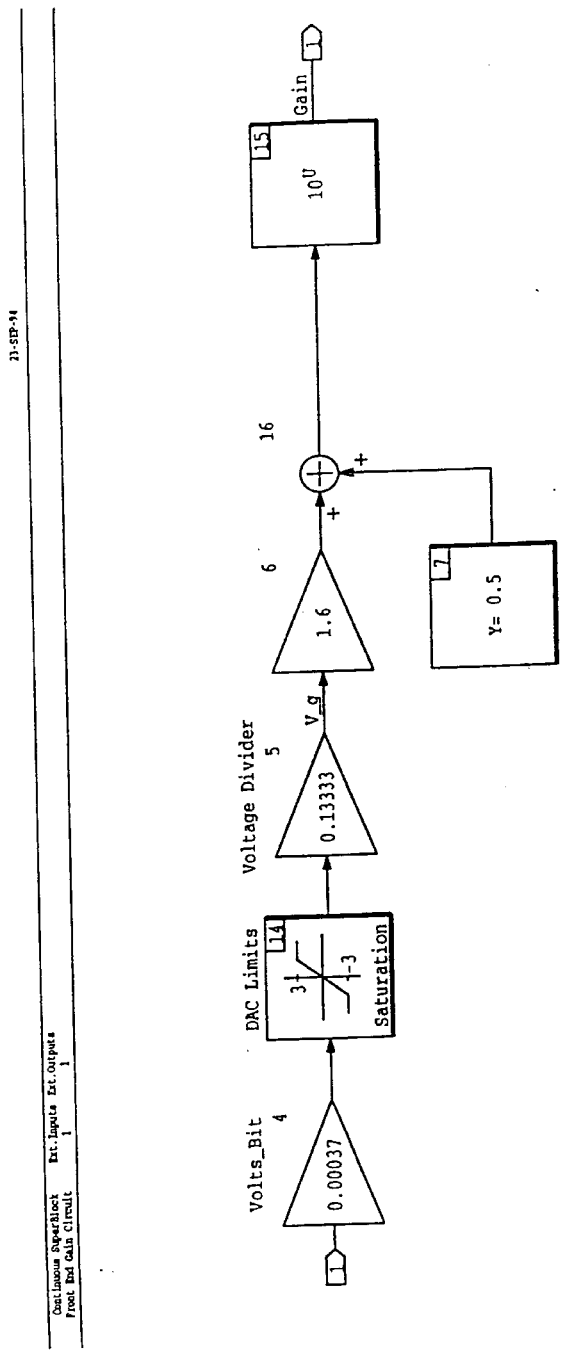

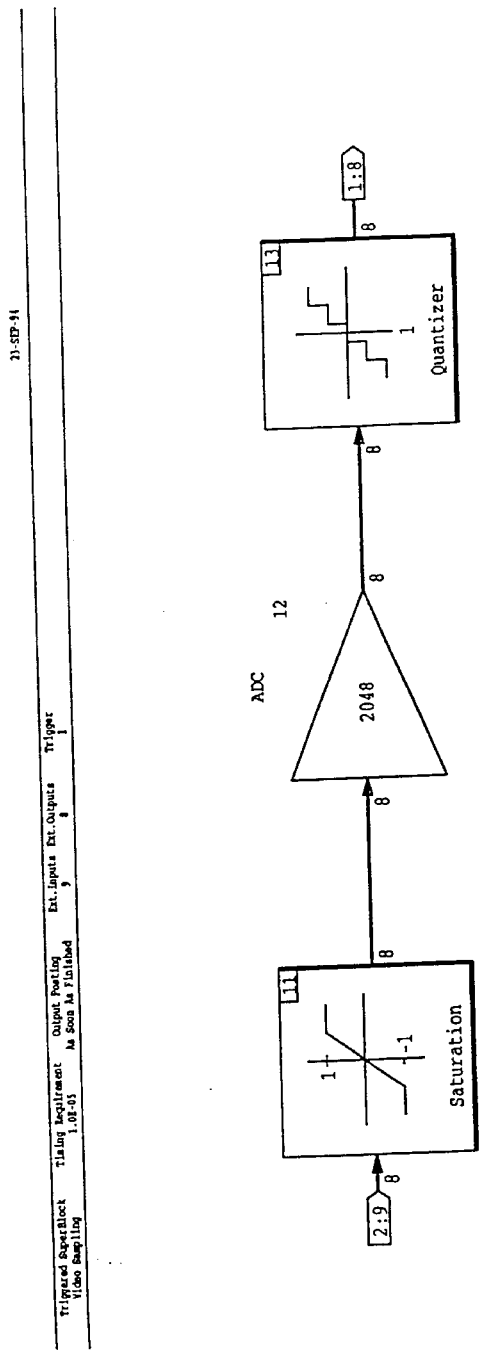

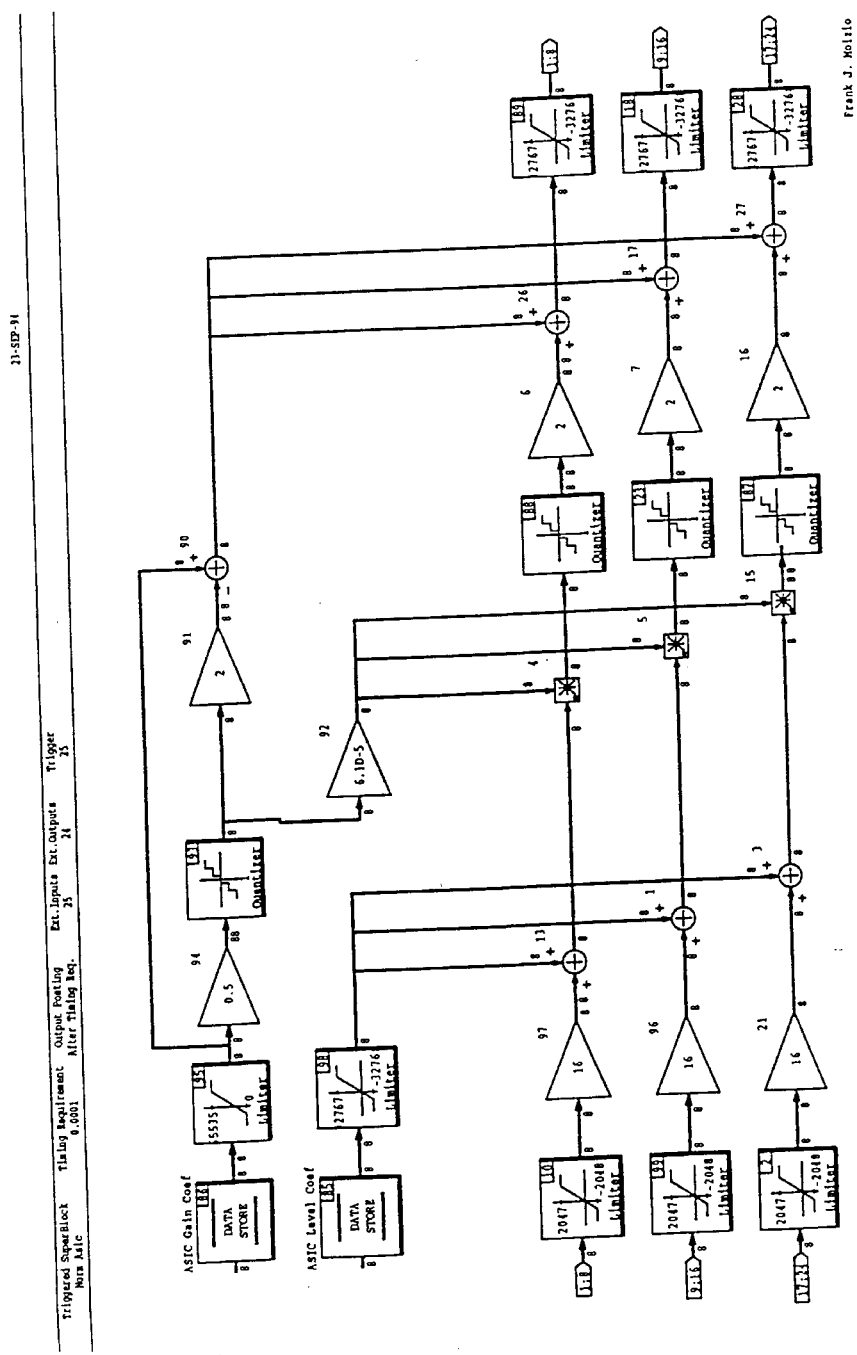

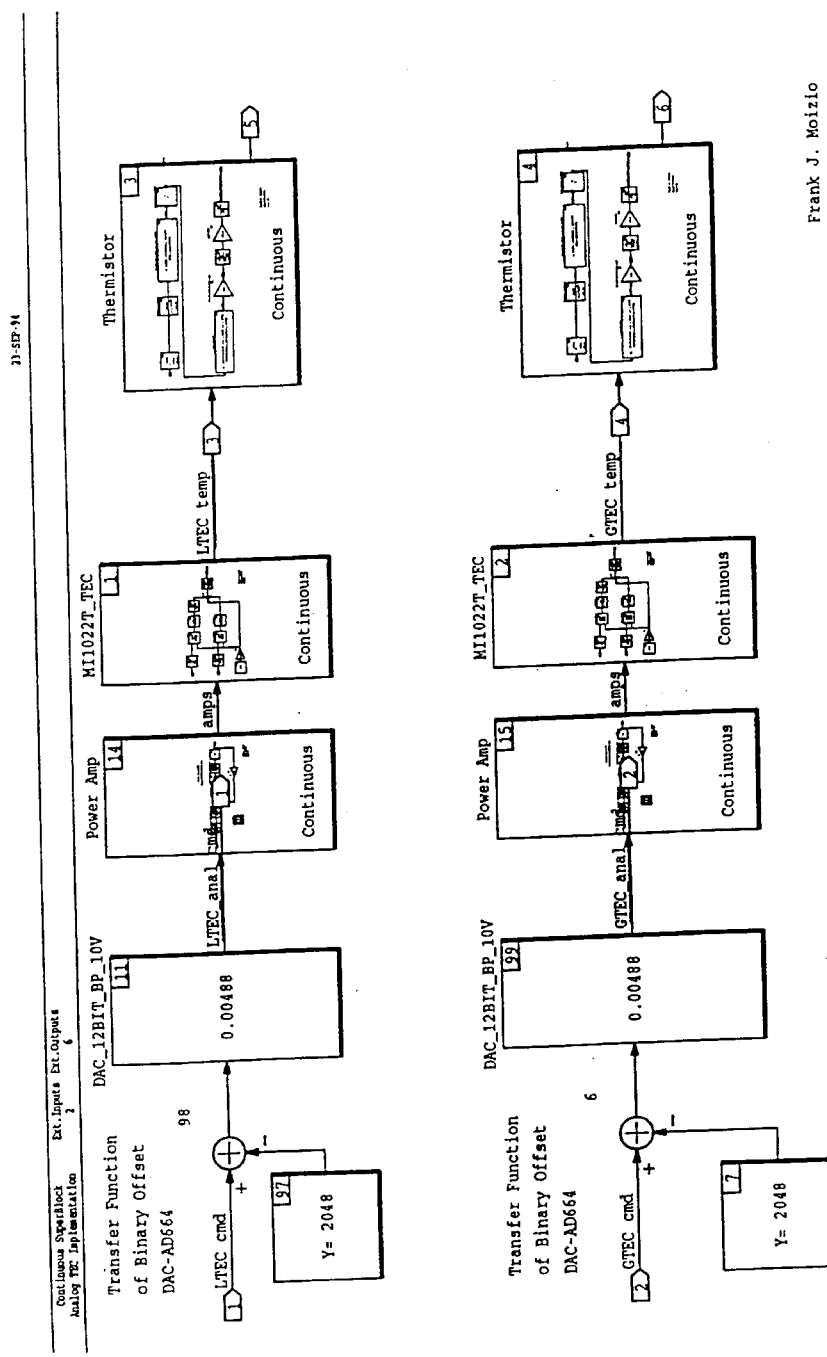

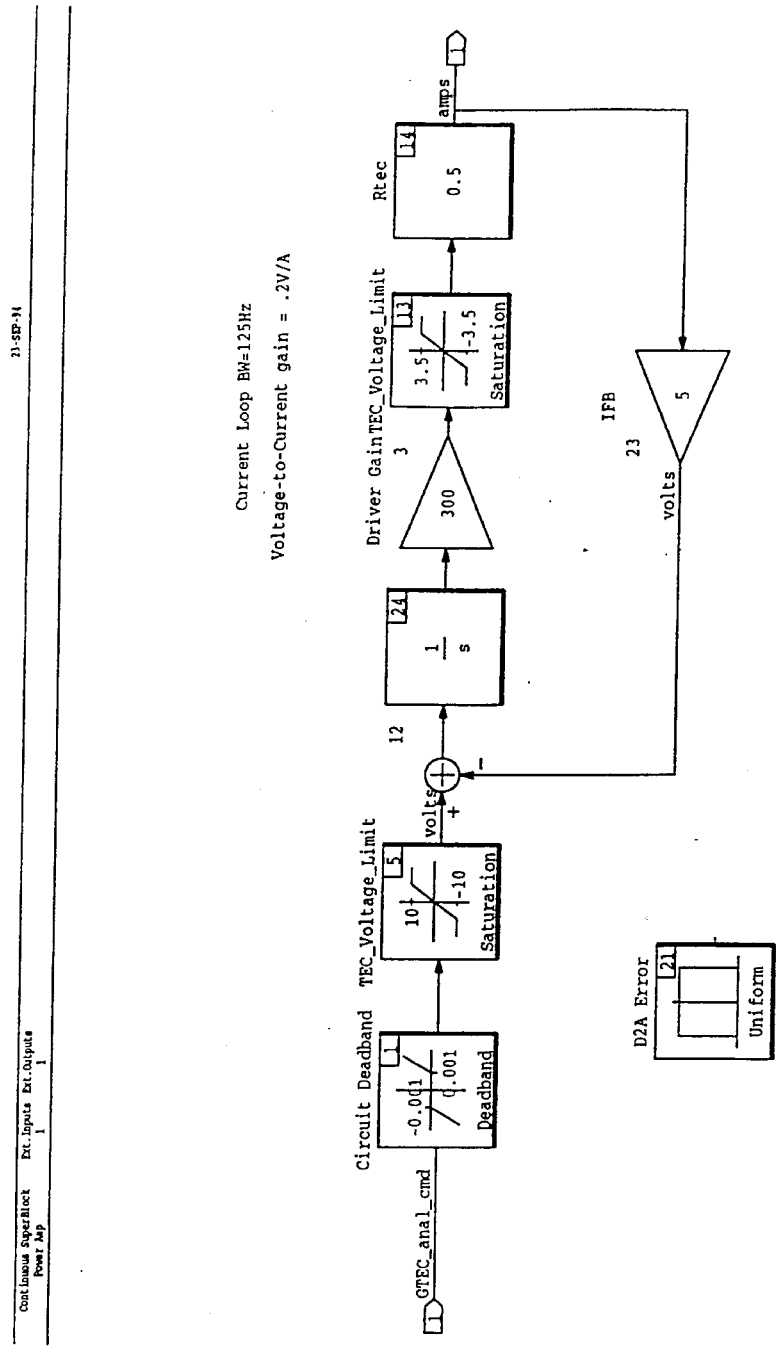

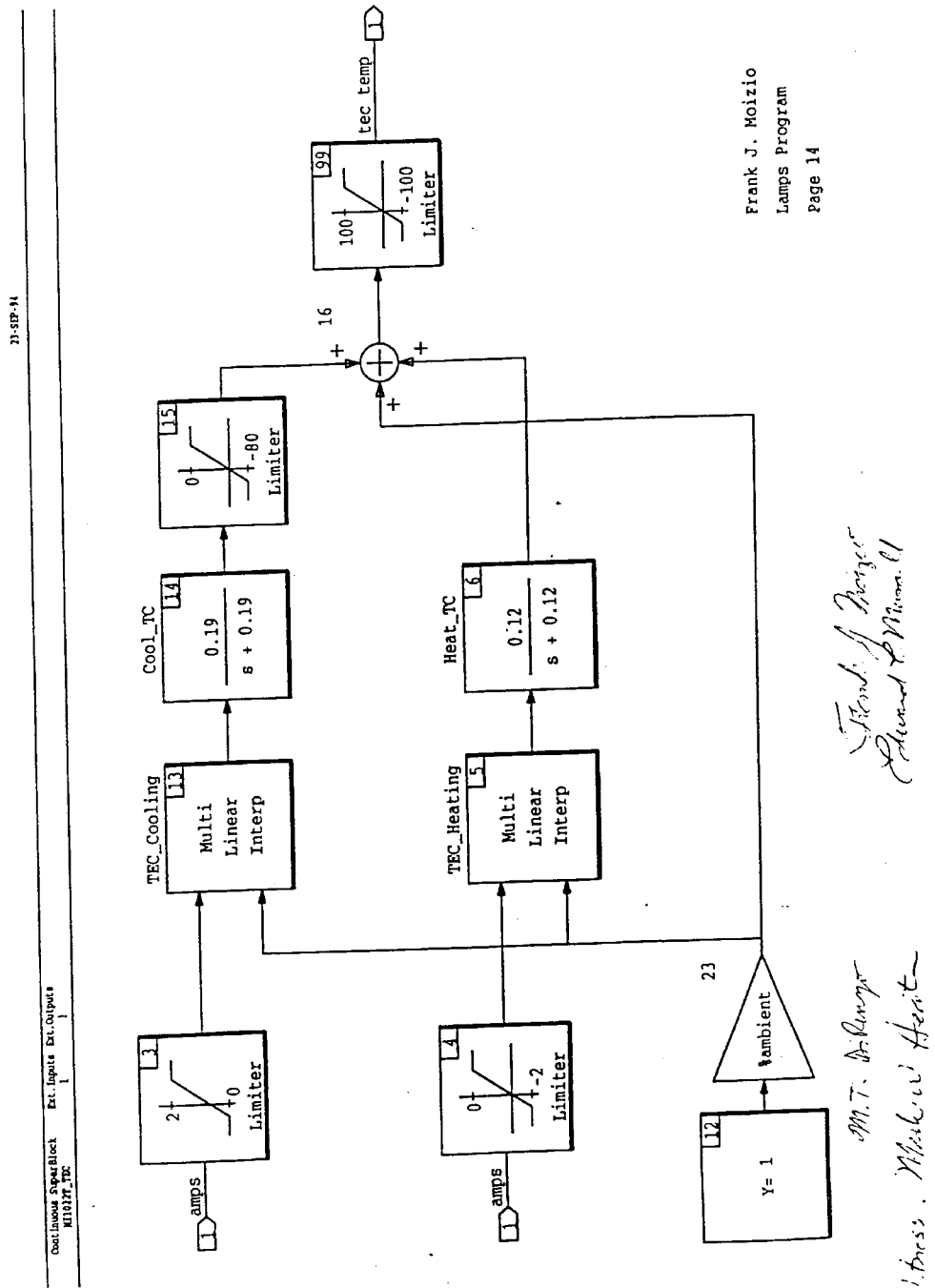

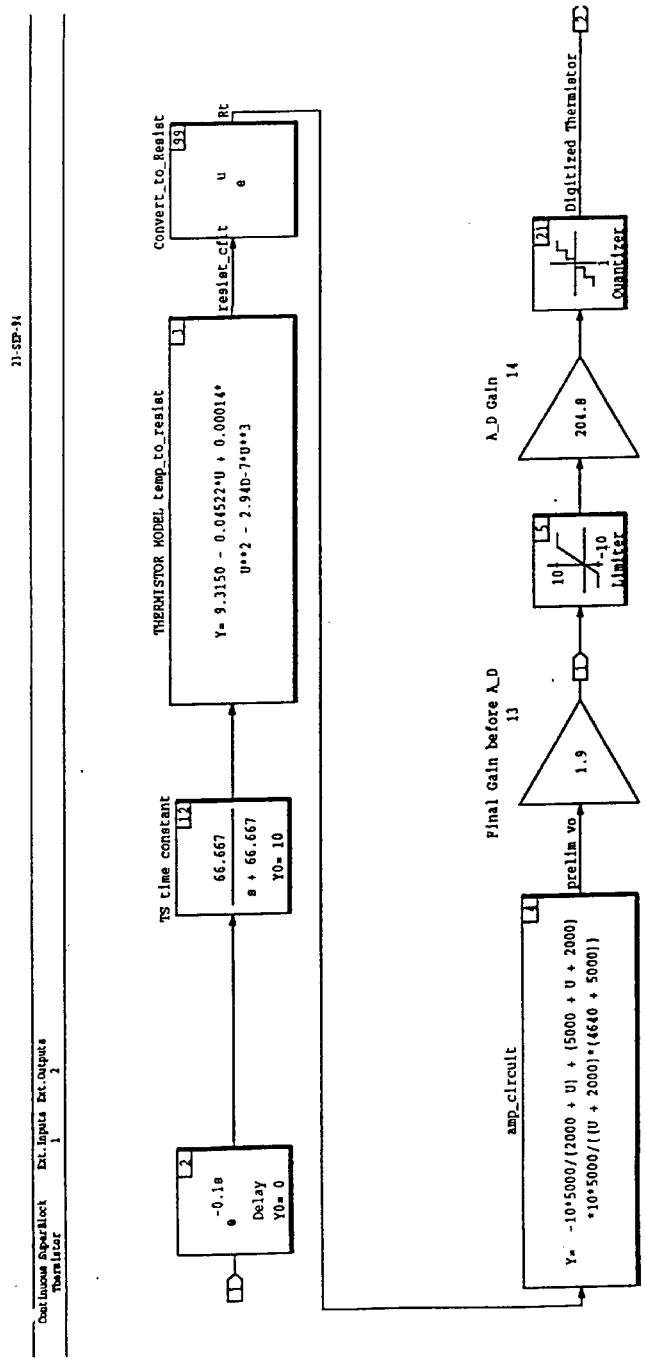
Frank J. Molzlo
Lamps Program
Page 15

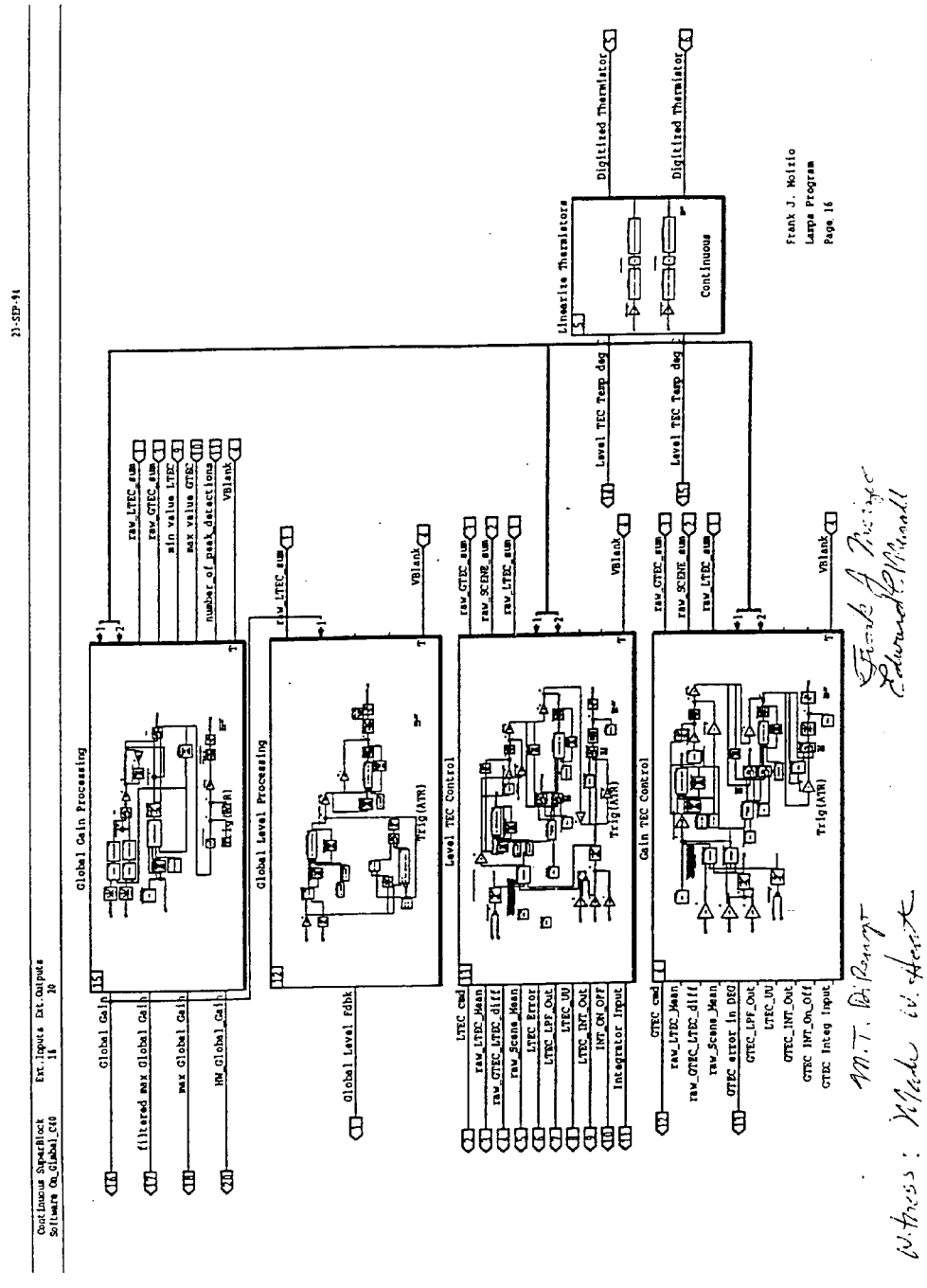

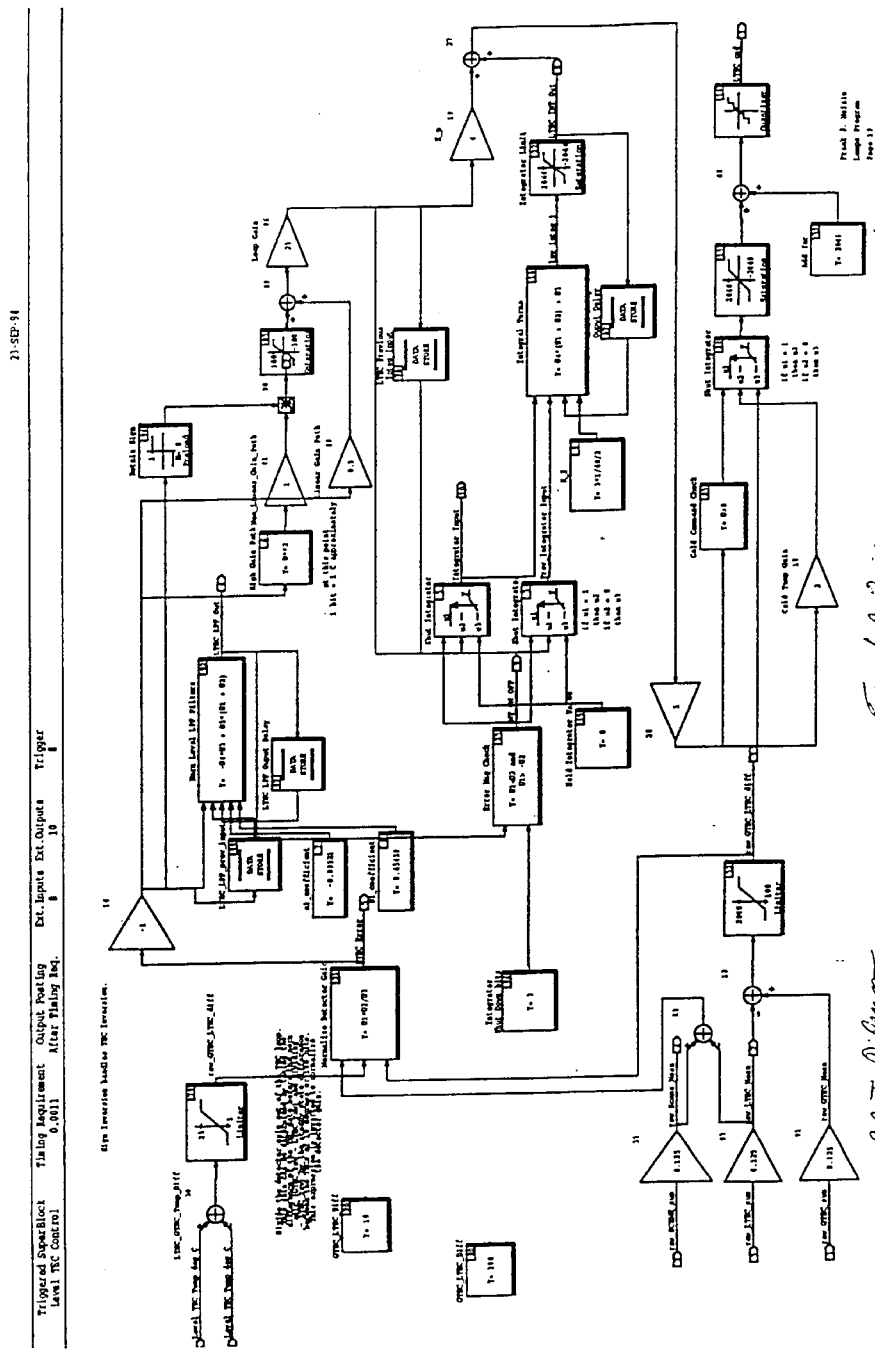

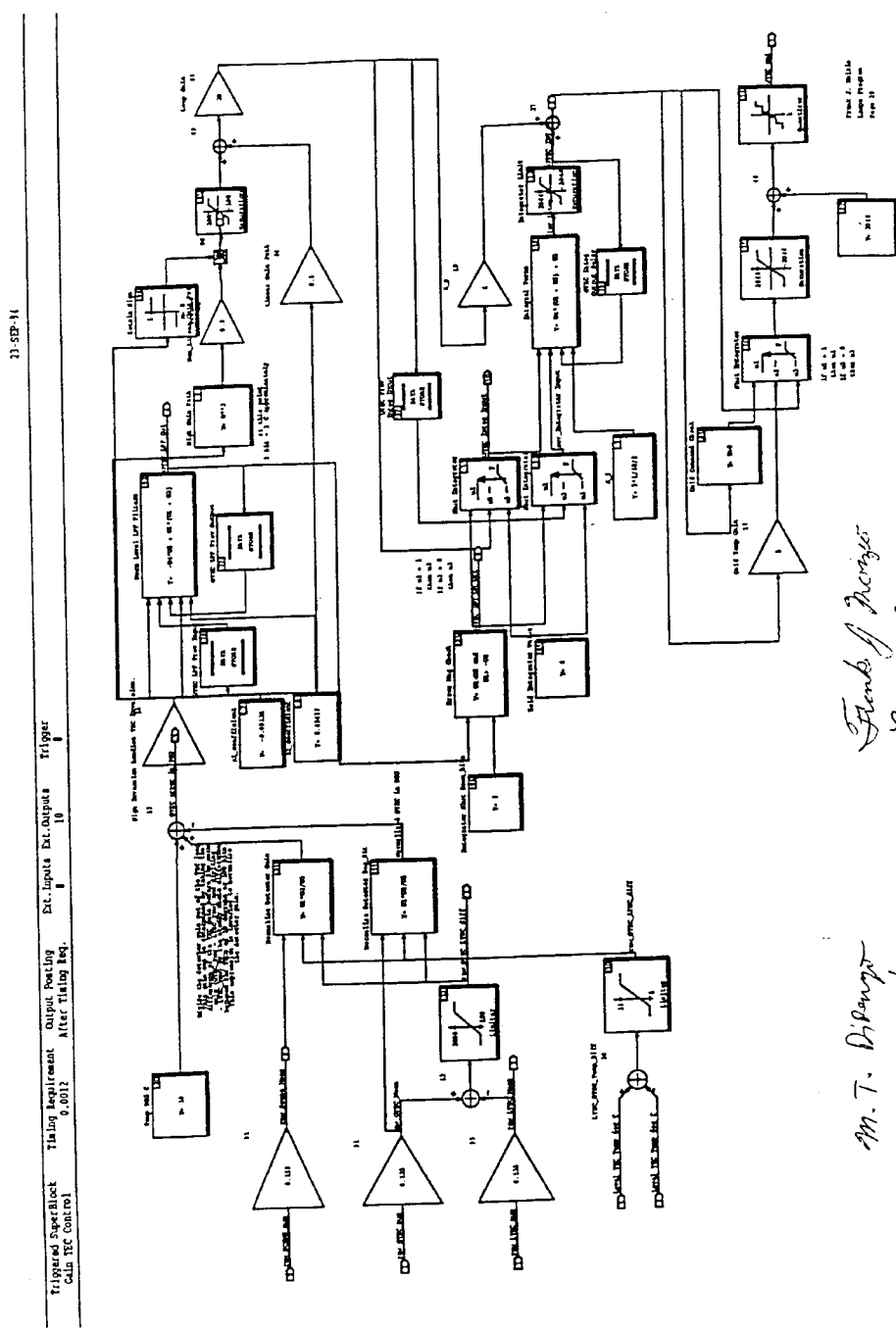

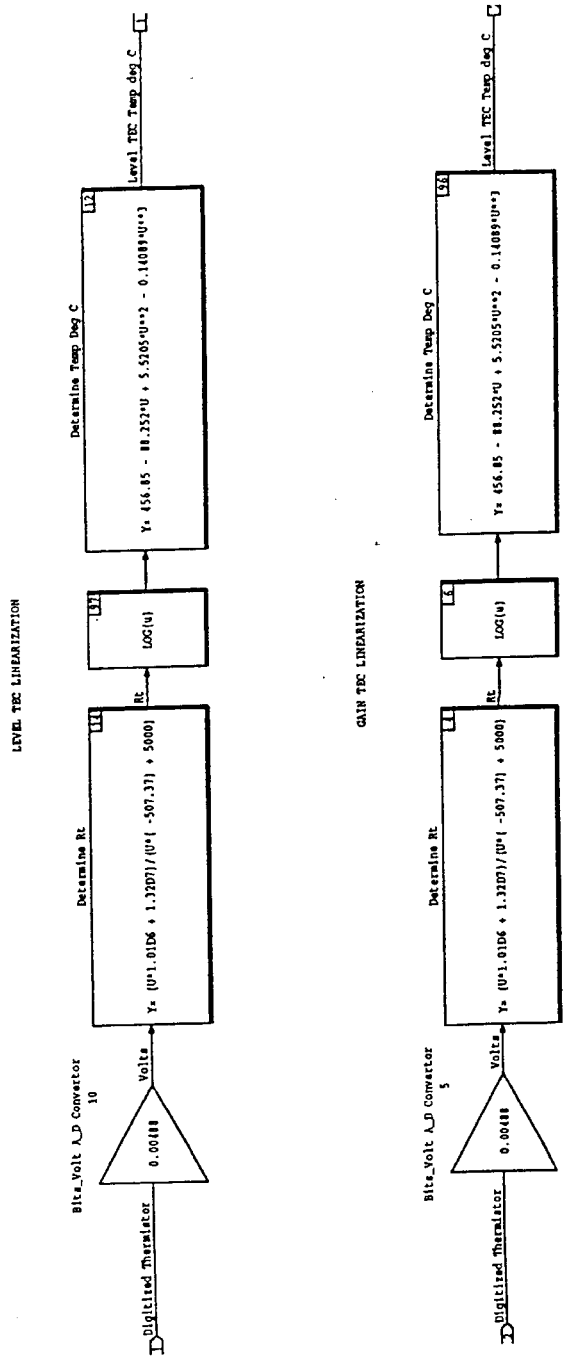

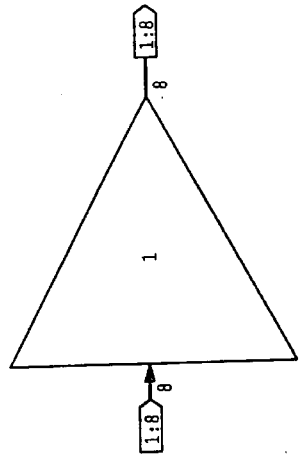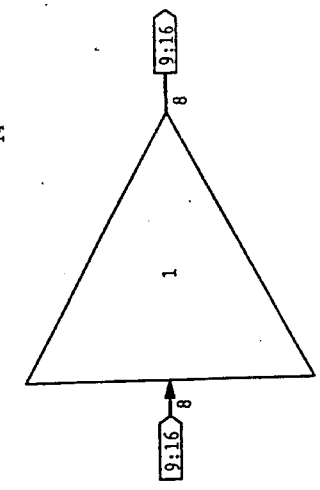

*Real-Time Adaptive Thermal Reference Control For Night Vision Systems*

APPENDIX C
Thermal Reference Transient Response Output Of
The Simulation Shown In Appendix B Michael T. DiRenzo            Frank J. Moizio Appendix C-1

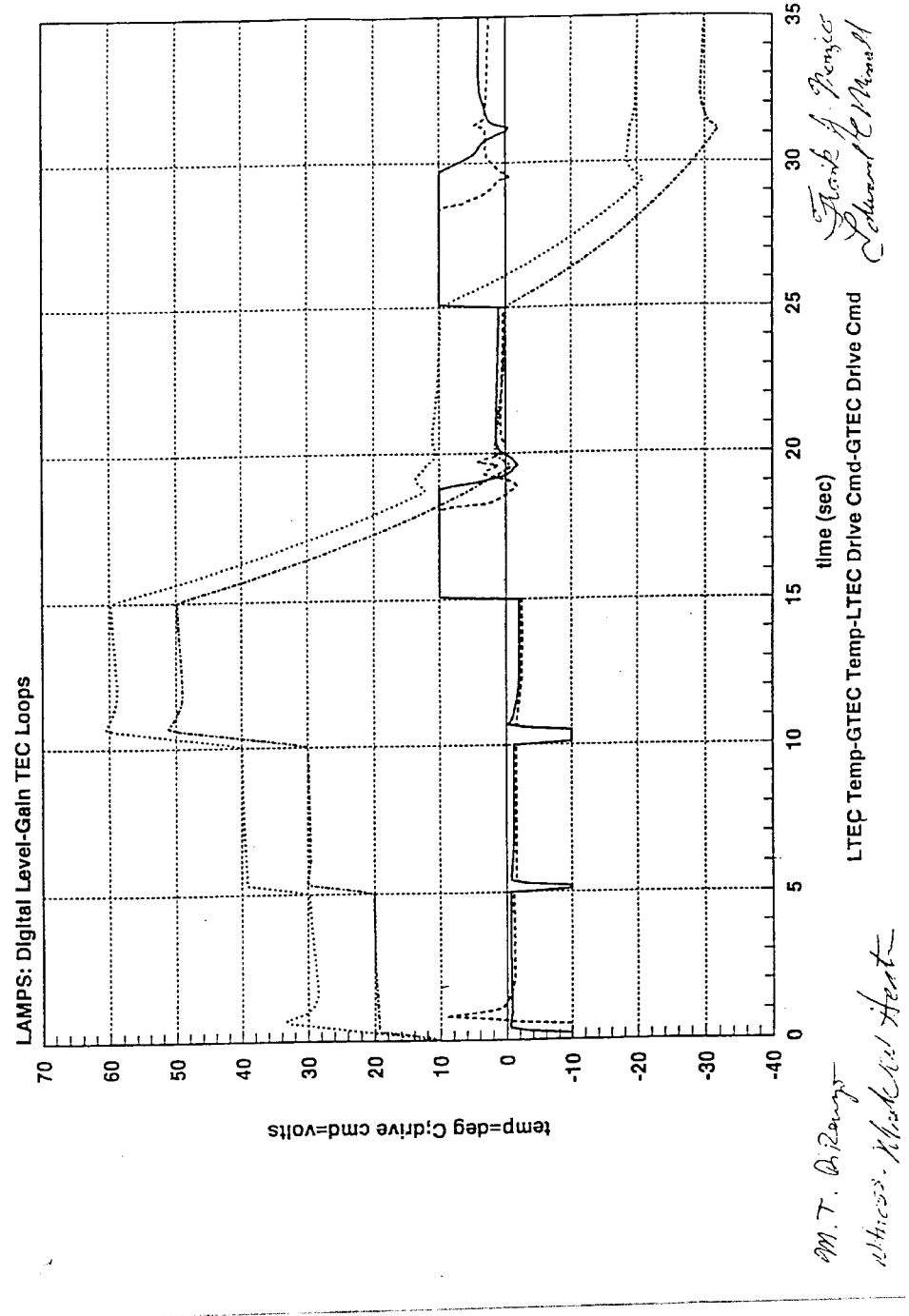

We claim:

1. A system for normalization of an infrared detector having control loops, each said loop including a thermal source and a command system for controlling the temperature of said thermal source including:
   (a) an error signal source for providing an error signal indicative of the difference between commanded temperature at said thermal source and actual temperature at said thermal source;
   (b) a feedback path from said thermal source to said error signal source providing a signal responsive to the temperature of said thermal source; and
   (c) a compensator coupled between said error signal source and said thermal source, said compensator including:
      (i) a first inverse compensation circuit responsive to said error signal for providing an output;
      (ii) a bandwidth maximizing compensation circuit responsive to the output of said first inverse compensation circuit; and
      (iii) a second inverse compensation circuit responsive to an output of said bandwidth maximizing compensation circuit, said thermal source being responsive to an output of said second inverse compensation circuit.

2. The system of claim 1 wherein the thermal source in a first of said control loops is a gain thermal reference, wherein the thermal source in a second of said control loops is a level thermal reference, and wherein said first inverse compensation circuit operates in accordance with the formula:

$$f_{est}^1() = \frac{(\text{Gain Ref Temp} - \text{Level Ref Temp})}{(\text{Bits gain} - \text{Bits level})}$$

where, Gain Ref Temp is the temperature of the gain thermal reference, Level Ref Temp is the temperature of the level thermal reference, Bits gain is the average output of the detector when viewing the gain thermal reference, and Bits level is the average output of the detector when viewing the level thermal reference.

3. The system of claim 2 wherein said bandwidth maximizing compensation circuit comprises a low pass filter, a non-linear gain section and a proportional plus integral filter.

4. The system of claim 3 wherein said non-linear gain section operates in accordance with the formula:

linear_part=K_linear*input non_linear_part=input$^2$*sign (input)

if (non_linear_part>limit1) then non_linear_part=limit1 if (non_linear_part<limit2) then non_linear_part=limit2 output=linear_part+non_linear_part;

where,
K_linear is a gain, and
limit1>limit2.

5. The system of claim 4 wherein said second inverse compensation circuit provides said output thereof in accordance with the formula:

output=$g_{est}^{-1}(x)*x$ where, $g_{est}^{-1}(x)$=K1, for x≧0
K2, for x<0,

K$_1$ and K$_2$ are constants resulting from a curve fit, and x is the input to the second inverse compensation circuit.

6. The system of claim 5 wherein said bandwidth maximizing compensation circuit includes a combination of linear filter functions.

7. The system of claim 3 wherein said second inverse compensation circuit provides said output thereof in accordance with the formula:

output=$g_{est}^{-1}(x)*x$ where, $g_{est}^{-1}(x)$=K1, for x≧0
K2, for x<0,

K$_1$ and K$_2$ are constants resulting from a curve fit, and x is the input to the second inverse compensation circuit.

8. The system of claim 2 wherein said second inverse compensation circuit provides said output thereof in accordance with the formula:

output=$g_{est}^{-1}(x)*x$ where, $g_{est}^{-1}(x)$=K1, for x≧0
K2, for x<0,

K$_1$ and K$_2$ are constants resulting from a curve fit, and x is the input to the second inverse compensation circuit.

9. The system of claim 2 wherein said second inverse compensation circuit provides said output thereof in accordance with the formula:

output=$g_{est}^{-1}(x)*x$ where, $g_{est}^{-1}(x)$=1, for all x.

10. The system of claim 2 wherein said second inverse compensation circuit provides said output thereof in accordance with the formula:

output=$g_{est}^{-1}(x)*x$ where $g_{est}^{-1}()$ is determined by using any well known method of approximating the input-output transfer function characteristics of said thermal reference.

11. The system of claim 1 wherein said bandwidth maximizing compensation circuit comprises a low pass filter, a non-linear gain section and a proportional plus integral filter.

12. The system of claim 11 wherein said non-linear gain section operates in accordance with the formula:

linear_part=K_linear*input non_linear_part=input$^2$*sign (input)

if (non_linear_part>limit1) then non_linear_part=limit1 if (non_linear_part<limit2) then non_linear_part=limit2 output=linear_part+non_linear_part;

where,

K_linear is a gain, and
limit1>limit2.

13. The system of claim 12 wherein said second inverse compensation circuit provides said output thereof in accordance with the formula:

$$\text{output} = g_{est}^{-1}(x) * x$$

where, $g_{est}^{-1}(x) = K1$, for $x \geq 0$
$K2$, for $x < 0$, $K_1$ and $K_2$ are constants resulting from a curve fit, and x is the input to the second inverse compensation circuit.

14. The system of claim 11 wherein said second inverse compensation circuit provides said output thereof in accordance with the formula:

$$\text{output} = g_{est}^{-1}(x) * x$$

where, $g_{est}^{-1}(x) = K1$, for $x \geq 0$
$K2$, for $x < 0$, $K_1$ and $K_2$ are constants resulting from a curve fit, and x is the input to the second inverse compensation circuit.

15. The system of claim 1 wherein said second inverse compensation circuit provides said output thereof in accordance with the formula:

$$\text{output} = g_{est}^{-1}(x) * x$$

where, $g_{est}^{-1}(x) = K1$, for $x \geq 0$
$K2$, for $x < 0$, $K_1$ and $K_2$ are constants resulting from a curve fit, and x is the input to the second inverse compensation circuit.

16. The system of claim 1 wherein said second inverse compensation circuit provides said output thereof in accordance with the formula:

$$\text{output} = g_{est}^{-1}(x) * x$$

where, $g_{est}^{-1}(x) = 1$, for all x.

17. The system of claim 1 wherein said second inverse compensation circuit provides said output thereof in accordance with the formula:

$$\text{output} < g_{est}^{-1}(x) * x$$

where $g_{est}^{-1}()$ is determined by using any well known method of approximating the input-output transfer function characteristics of said thermal reference.

18. The system of claim 1 wherein said bandwidth maximizing compensation circuit includes a combination of linear filter functions.

19. A system for normalization of an infrared detector having a control loop, comprising a thermal source and a command system which controls the temperature of said thermal source and which includes:

(a) an error signal source for providing an error signal indicative of the difference between commanded temperature at said thermal source and actual temperature at said thermal source;

(b) a feedback path from said thermal source to said error signal source providing a signal responsive to the temperature of said thermal source; and (c) a compensator coupled between said error signal source and said thermal source, said compensator including;
   (i) a first inverse compensation circuit responsive to said error signal for providing an output;
   (ii) a bandwidth maximizing compensation circuit responsive to the output of said first inverse compensation circuit; and
   (iii) a second inverse compensation circuit responsive to an output of said bandwidth maximizing compensation circuit, said thermal source being responsive to an output of said second inverse compensation circuit.

20. The system of claim 19 wherein said first inverse compensation circuit operates in accordance with the formula:

$$f_{est}^1() = \frac{(\text{Gain Ref Temp} - \text{Level Ref Temp})}{(\text{Bits gain} - \text{Bits level})}$$

where, Gain Ref Temp is the temperature of the gain thermal reference, Level Ref Temp is the temperature of the level thermal reference, Bits gain is the average output of the detector when viewing the gain thermal reference, and Bits level is the average output of the detector when viewing the level thermal reference.

21. The system of claim 19 wherein said bandwidth maximizing compensation circuit comprises a low pass filter, a non-linear gain section and a proportional plus integral filter.

22. The system of claim 21 wherein said non-linear gain section operates in accordance with the formula:

linear_part=K_linear*input non_linear_part=input1*sign (input)

if (non_linear_part>limit1) then non_linear_part=limit1 if (non_linear_part<limit2) then non_linear_part=limit2 output=linear_part+non_linear_part;

where,
K_linear is a gain, and
limit1>limit2.

23. The system of claim 19 wherein said second inverse compensation circuit provides said output thereof in accordance with the formula:

$$\text{output} = g_{est}^{-1}(x) * x$$

where, $g_{est}^{-1}(x) = K1$, for $x \geq 0$
$K2$, for $x < 0$, $K_1$ and $K_2$ are constants resulting from a curve fit approximating a transfer characteristic of said thermal source, and x is the input to the second inverse compensation circuit.

24. The system of claim 19 wherein said second inverse compensation circuit provides an output in accordance with the formula:

$$\text{output} = g_{est}^{-1}(x) * x$$

where, $g_{est}^{-1}(x)=1$, for all x.

25. The system of claim 19 wherein said second inverse compensation circuit provides said output thereof in accordance with the formula:

$$output = g_{est}^{-1}(x) * x$$

where $g^{-1}{}_{set}()$ is determined by using any well known method of approximating the input-output transfer function characteristics of said thermal reference.

26. The system of claim 19 wherein said bandwidth maximizing compensation circuit includes a combination of linear filter functions.

27. The system of claim 19, wherein said first inverse compensation circuit has a transfer function representative of an inverse of a non-linear characteristic of said infrared detector, wherein said second inverse compensation circuit has a transfer function representative of an inverse of a non-linear characteristic of said thermal source, and wherein said commanded temperature is a function of an average temperature of a scene viewed by said infrared detector.

* * * * *

UNITED STATES PATENT AND TRADEMARK OFFICE
CERTIFICATE OF CORRECTION

PATENT NO. : 5,920,066
DATED : July 6, 1999
INVENTOR(S) : DiRenzo, et al.

It is certified that error appears in the above-identified patent and that said Letters Patent is hereby corrected as shown below:

Column 3, line 25, after "linear" insert -- _ --.
Column 3, line 29, after "linear" first occurrence, insert -- _ --.
Column 3, line 29, after "linear" second occurrence, insert -- _ --.
Column 6, line 32, after "linear" second occurrence, insert -- _ --.
Column 7, line 48, delete "$R_T=R_{T0}$ esp $\{\beta(1/T-1/T_0\}$" and insert
--$R_T=R_{T0}$ exp $\{\beta(1/T-1/T_O\}$--.
Column 7, line 66, delete
"$V_0 = (R_b/(R_a+R_b))V_{ref}-(R_2/(R_1+R_t))V_{ref}+(R_b/(R_a+R_b))(R_2/(R_1R+R_T))V_{ref}$" and insert
--$V_0 = (R_b/(R_a+R_b))V_{ref}-(R_2/(R_1+R_T))V_{ref}+(R_b/(R_a+R_b))(R_2/(R_1+R_T))V_{ref}$--.
Column 8, line 19, delete "$f(\ )f^{-1}_{est}(\ )$" and insert --$f(\ )*f^{-1}_{est}(\ )$--.
Column 8, line 20, delete "$g(\ )g^{-1}_{est}(\ )$" and insert --$g(\ )*g^{-1}_{est}(\ )$--.
Column 87, line 52, delete "output<$g_{est}^{-1}$ (x)*x" and insert --output=$g_{est}^{-1}$ (x)*x--.
Column 88, line 41, after "part=" delete "input 1" and insert --input$^2$--.

Signed and Sealed this

Twenty-third Day of May, 2000

Attest:

Q. TODD DICKINSON

*Attesting Officer*    *Director of Patents and Trademarks*